(12) United States Patent
Nabeta

(10) Patent No.: US 9,804,358 B2
(45) Date of Patent: Oct. 31, 2017

(54) BRIGHT LARGE APERTURE IMAGING LENS AND IMAGING UNIT

(71) Applicant: SONY CORPORATION, Tokyo (JP)

(72) Inventor: Kenshi Nabeta, Kumamoto (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/779,523

(22) PCT Filed: Feb. 13, 2014

(86) PCT No.: PCT/JP2014/053277
§ 371 (c)(1),
(2) Date: Sep. 23, 2015

(87) PCT Pub. No.: WO2014/162779
PCT Pub. Date: Oct. 9, 2014

(65) Prior Publication Data
US 2016/0054543 A1 Feb. 25, 2016

(30) Foreign Application Priority Data

Apr. 1, 2013 (JP) .................................. 2013-075653

(51) Int. Cl.
*G02B 9/62* (2006.01)
*G02B 13/00* (2006.01)
*G02B 27/00* (2006.01)
(52) U.S. Cl.
CPC ........... *G02B 9/62* (2013.01); *G02B 13/0045* (2013.01); *G02B 27/0025* (2013.01)

(58) Field of Classification Search
CPC .. G02B 13/0045; G02B 9/62; G02B 27/0025; G02B 3/04; G02B 3/00; G02B 13/04; G02B 9/64
USPC .......................... 359/708–713, 754–756, 759
See application file for complete search history.

(56) References Cited

U.S. PATENT DOCUMENTS

| 7,911,711 B1* | 3/2011 | Tang .................. G02B 13/0045 359/715 |
| 2006/0132928 A1* | 6/2006 | Nakatani .............. G02B 15/173 359/687 |
| 2006/0140606 A1* | 6/2006 | Terada ................. G02B 15/173 396/72 |
| 2012/0188654 A1* | 7/2012 | Huang ..................... G02B 9/62 359/713 |

(Continued)

FOREIGN PATENT DOCUMENTS

| JP | 2007-264180 A | 10/2007 |
| JP | 2010-048996 A | 3/2010 |

(Continued)

*Primary Examiner* — Darryl J. Collins
*Assistant Examiner* — Justin Sierchio
(74) *Attorney, Agent, or Firm* — Chip

(57) ABSTRACT

An imaging lens includes: a first lens having positive refractive power; a second lens having positive refractive power; a third lens having negative refractive power; a fourth lens having positive refractive power; a fifth lens having negative refractive power; and a sixth lens having positive or negative refractive power in vicinity of an optical axis, a peripheral portion of a surface on an image side of the sixth lens including one or more inflection points, the first to sixth lenses being provided in order from an object side.

13 Claims, 13 Drawing Sheets

(56) References Cited

U.S. PATENT DOCUMENTS

| | | | |
|---|---|---|---|
| 2012/0212838 A1* | 8/2012 | Ohashi | G02B 13/0045 359/713 |
| 2012/0243108 A1* | 9/2012 | Tsai | G02B 13/18 359/713 |
| 2013/0265656 A1* | 10/2013 | Asami | B60R 1/00 359/752 |
| 2013/0314804 A1* | 11/2013 | Kubota | G02B 13/0015 359/757 |
| 2013/0342918 A1* | 12/2013 | Kubota | G02B 13/0045 359/713 |
| 2014/0063323 A1* | 3/2014 | Yamazaki | G02B 13/18 348/335 |
| 2014/0153114 A1* | 6/2014 | Suzuki | G02B 13/0045 359/714 |
| 2014/0192422 A1* | 7/2014 | Tang | G02B 9/62 359/713 |
| 2014/0204479 A1* | 7/2014 | Asami | G02B 13/04 359/762 |
| 2014/0211324 A1* | 7/2014 | Ishizaka | G02B 13/0045 359/708 |
| 2014/0211328 A1* | 7/2014 | Hashimoto | G02B 13/0045 359/714 |
| 2014/0293458 A1* | 10/2014 | Nabeta | G02B 13/0045 359/759 |
| 2015/0015971 A1* | 1/2015 | Huang | G02B 9/62 359/713 |
| 2015/0185442 A1* | 7/2015 | Katsuragi | G02B 9/60 348/360 |
| 2016/0011403 A1* | 1/2016 | Asami | G02B 13/0045 359/740 |
| 2016/0054543 A1* | 2/2016 | Nabeta | G02B 13/0045 359/713 |

FOREIGN PATENT DOCUMENTS

| | | | | |
|---|---|---|---|---|
| JP | 2011-085733 A | | 4/2011 | |
| JP | 2011-102838 A | | 5/2011 | |
| JP | 2014-145961 | * | 8/2014 | G02B 13/00 |

* cited by examiner

[ FIG. 1 ]
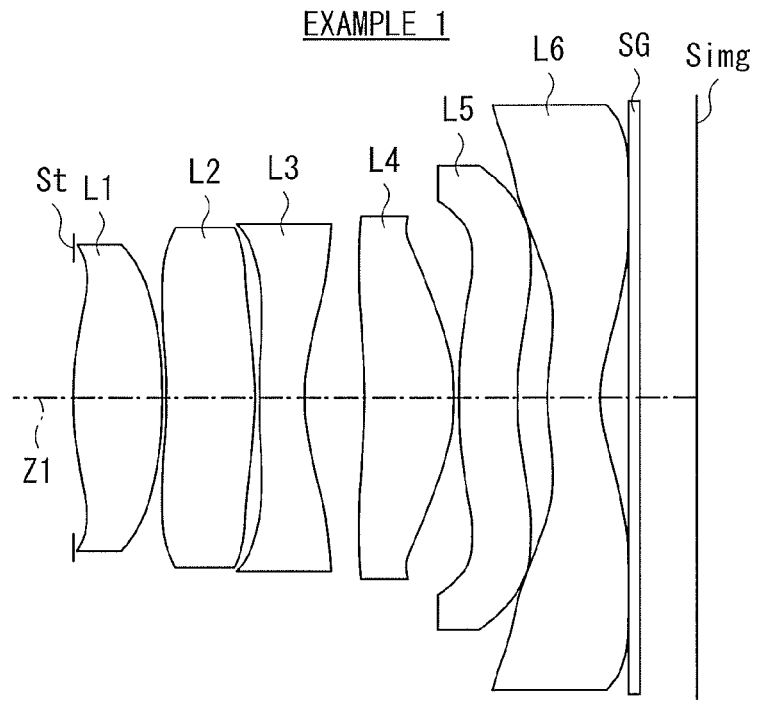
[ FIG. 2 ]
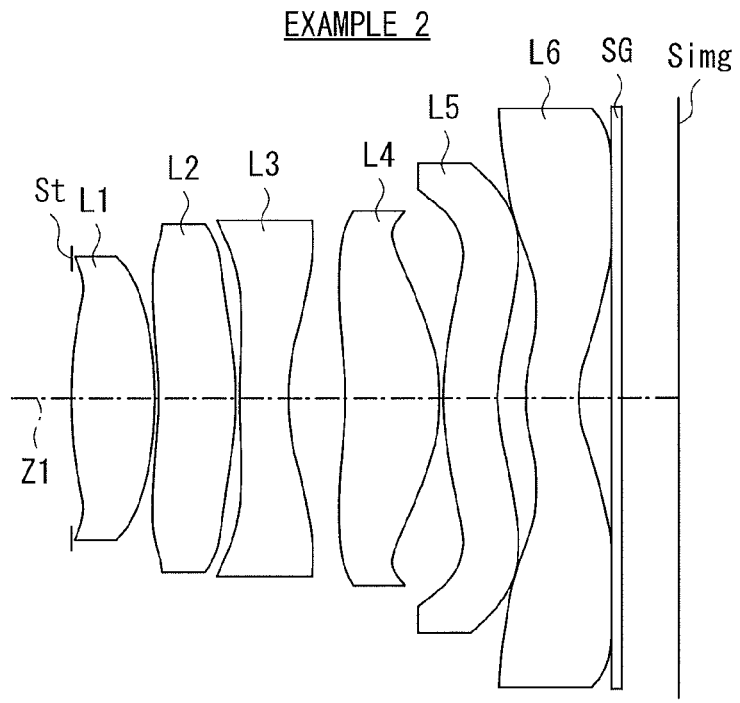

[ FIG. 3 ]
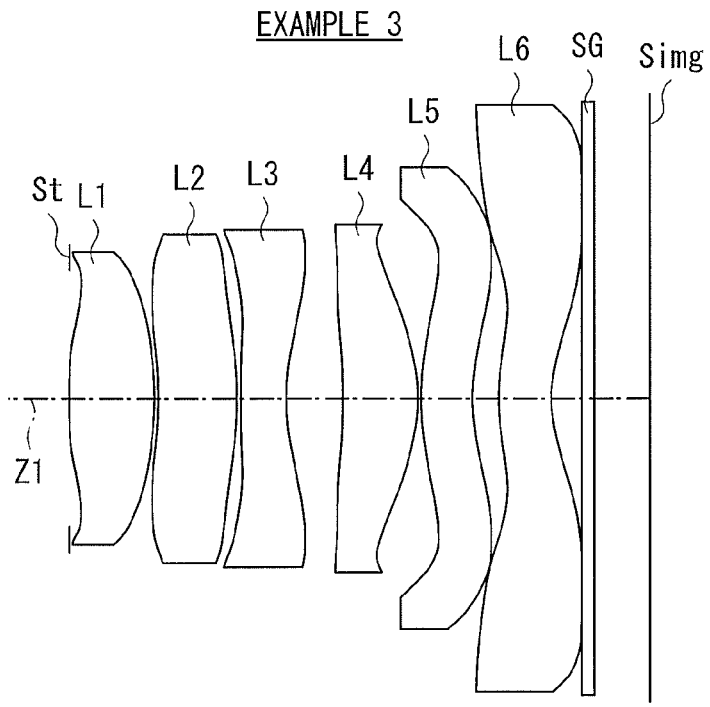
[ FIG. 4 ]
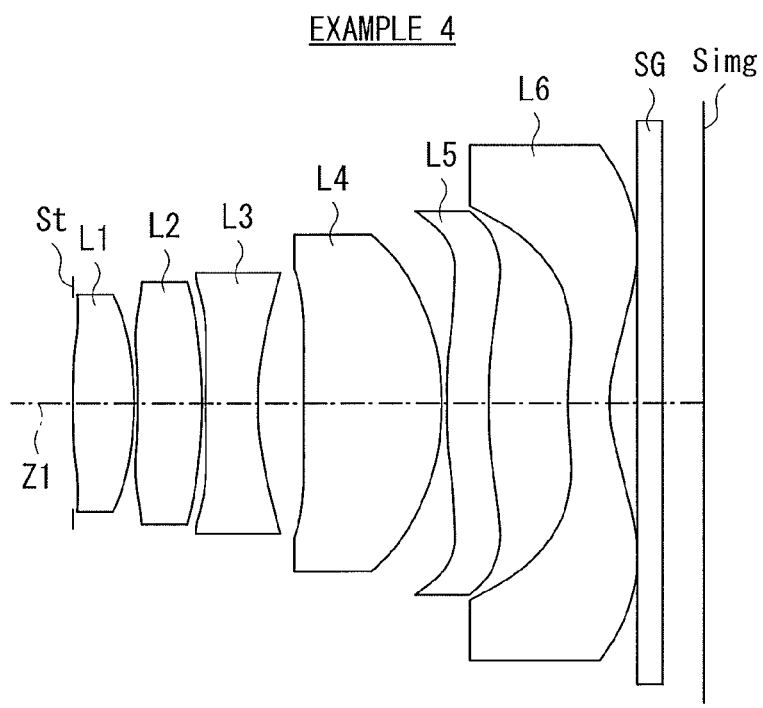

[ FIG. 5 ]
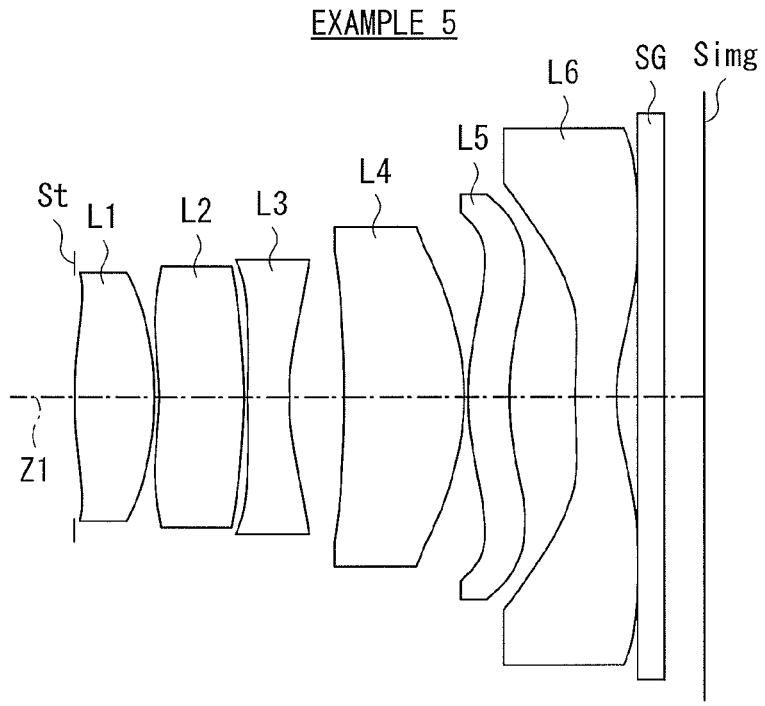
[ FIG. 6 ]
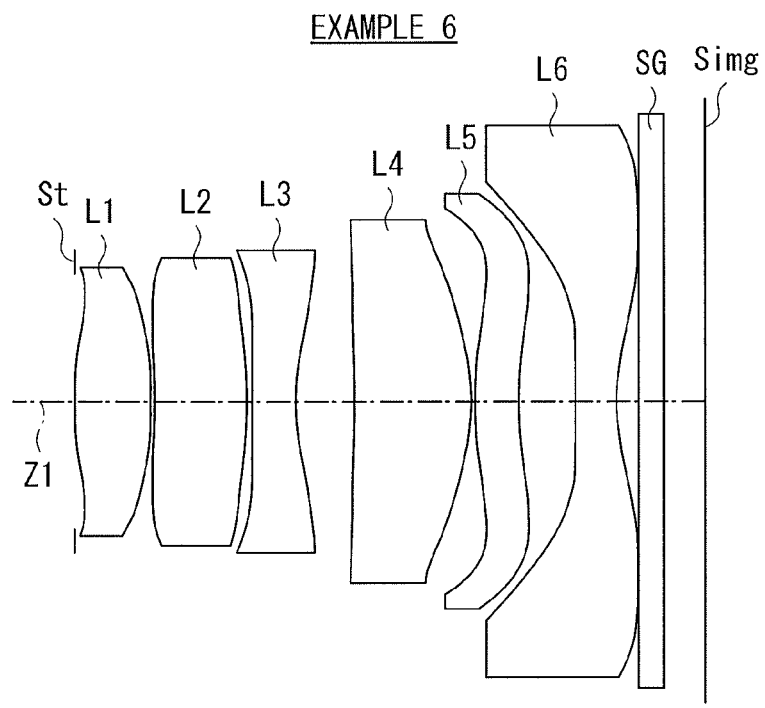

[ FIG. 7 ]
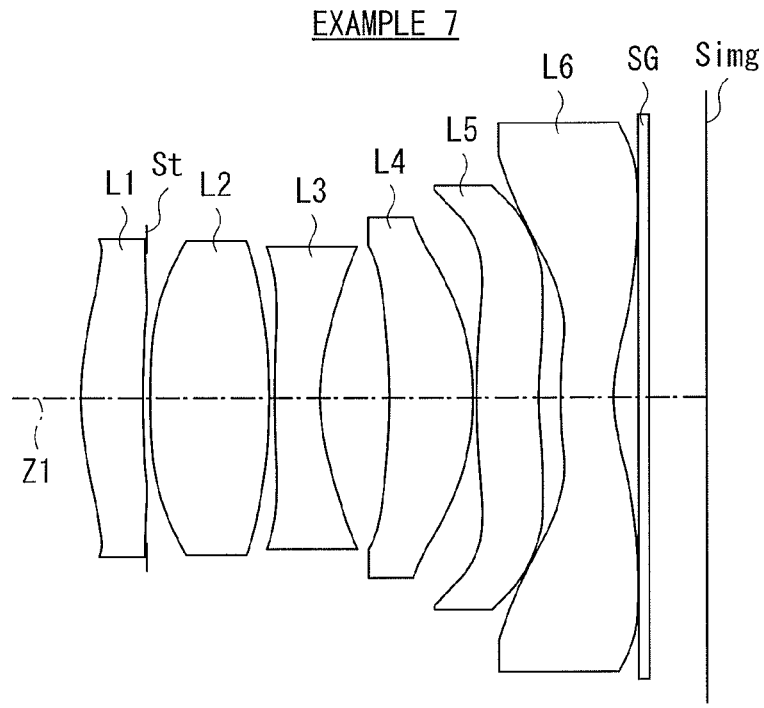
[ FIG. 8 ]
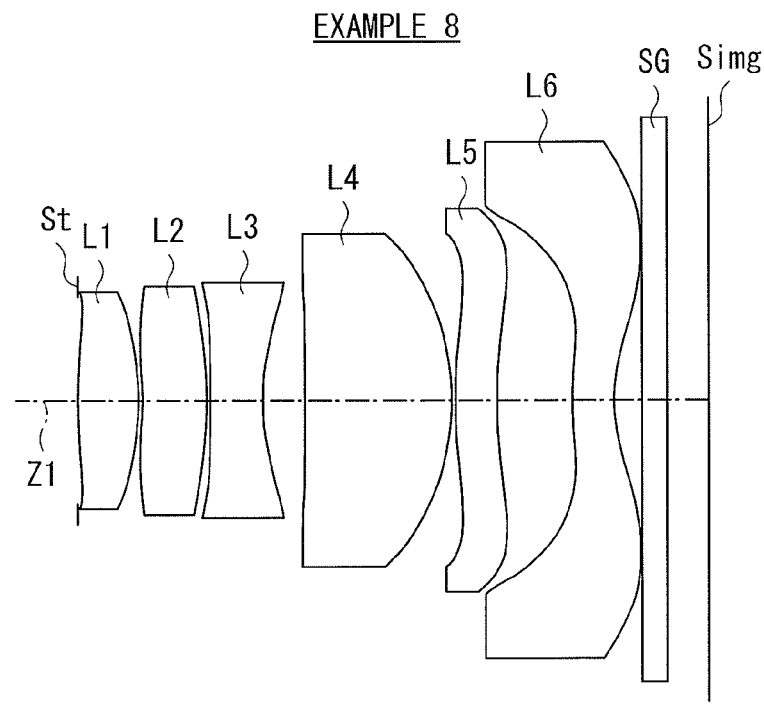

[FIG. 9]
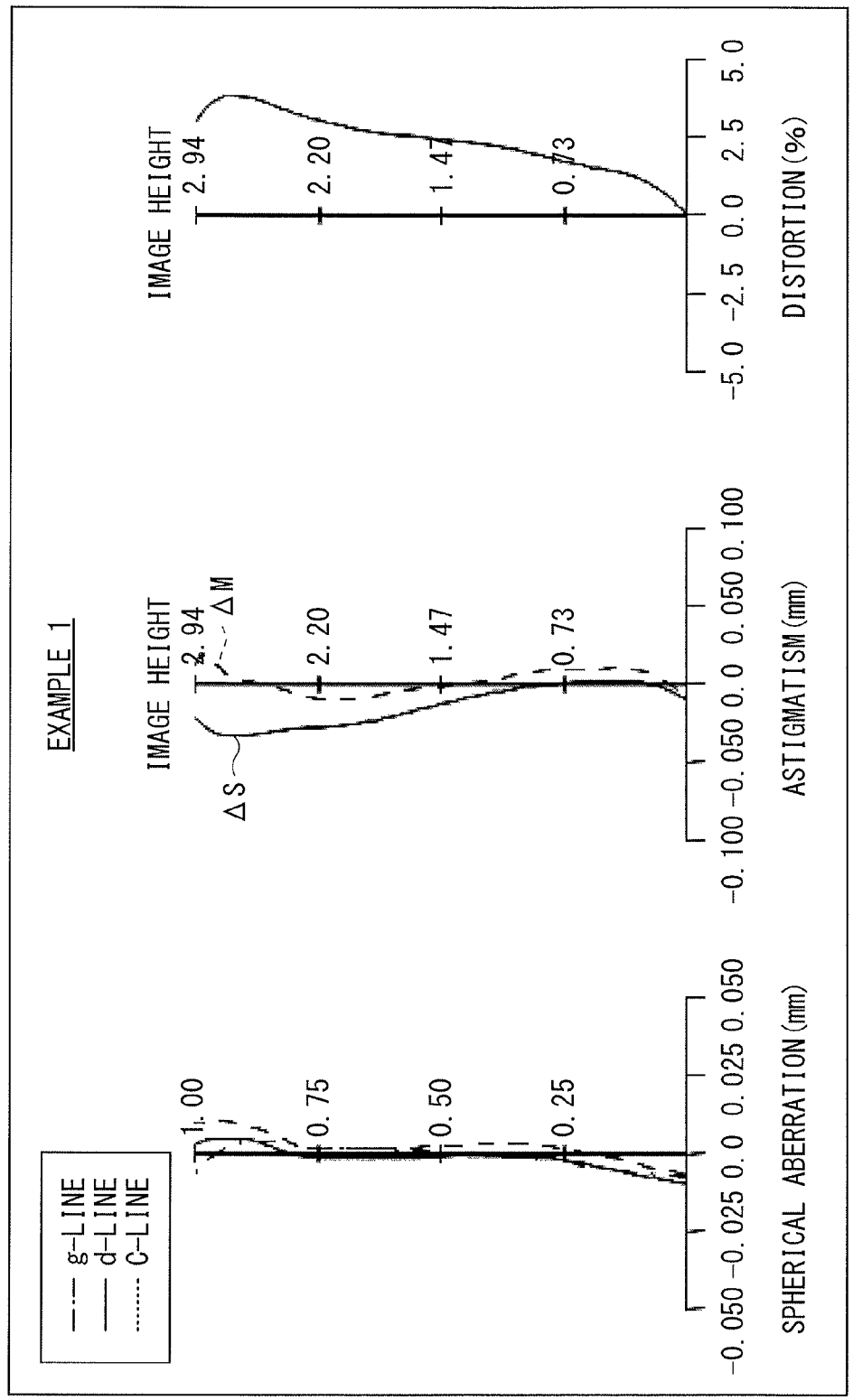

[ FIG. 10 ]
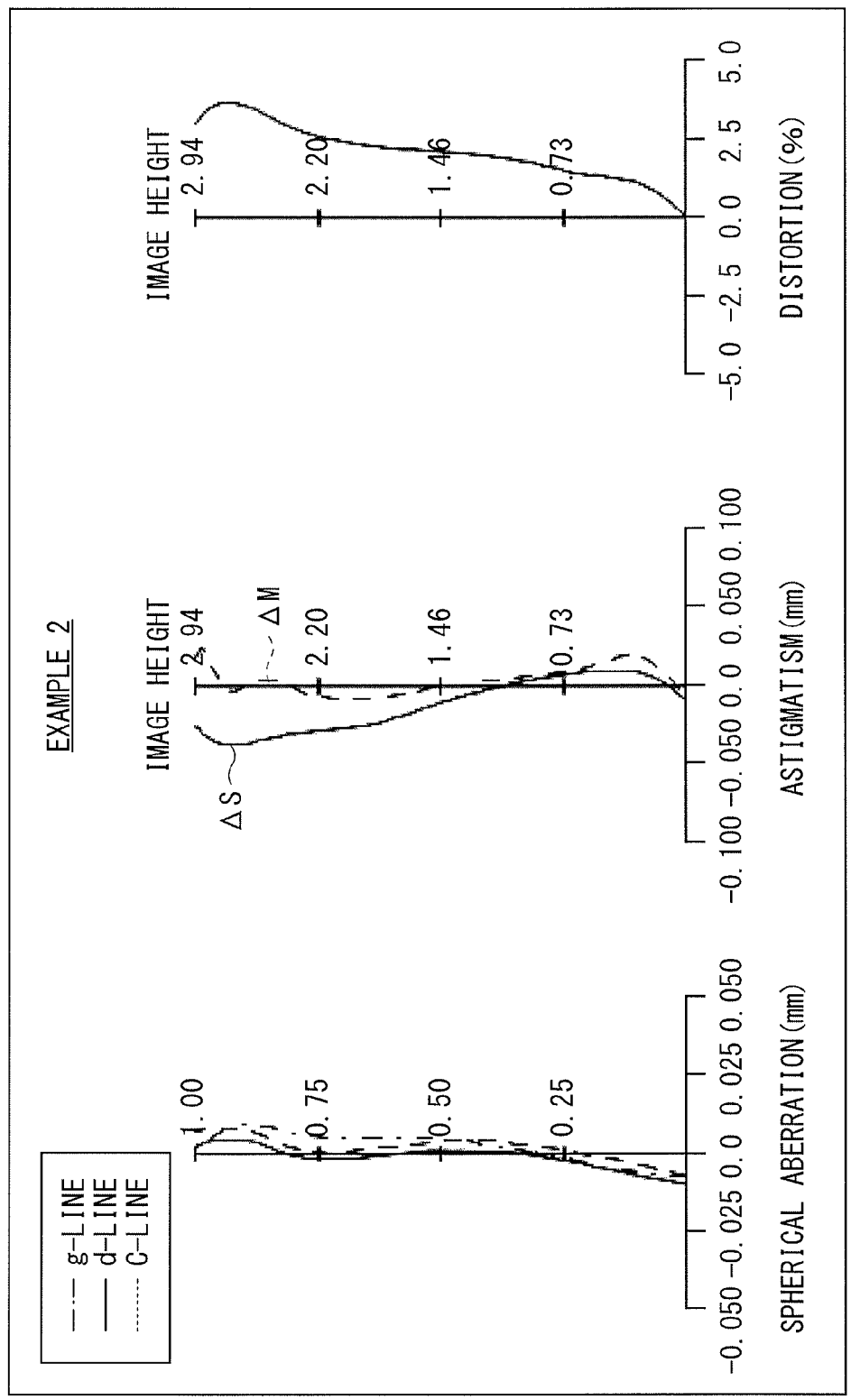

[ FIG. 11 ]
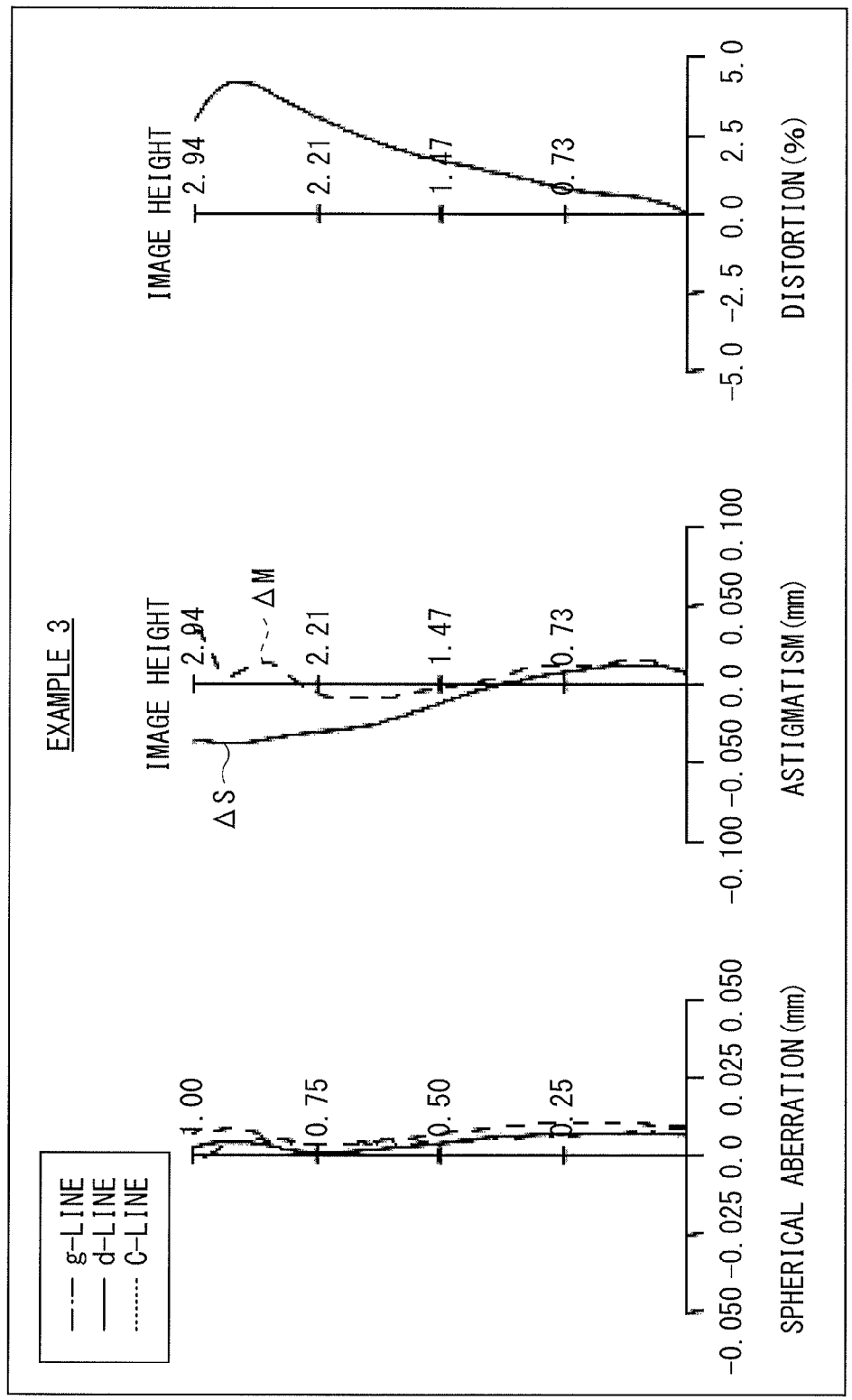

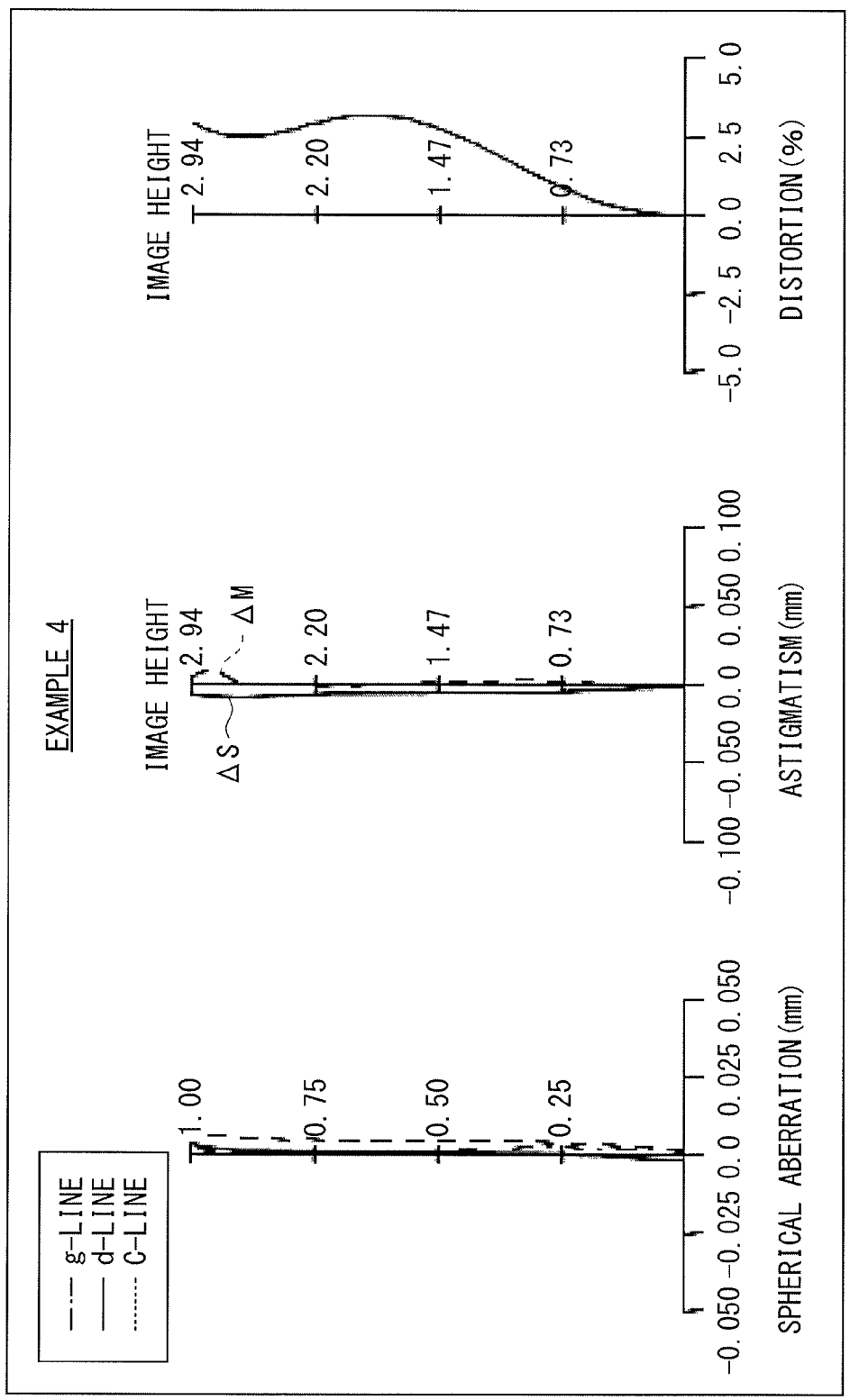
[ FIG. 12 ]

[ FIG. 13 ]
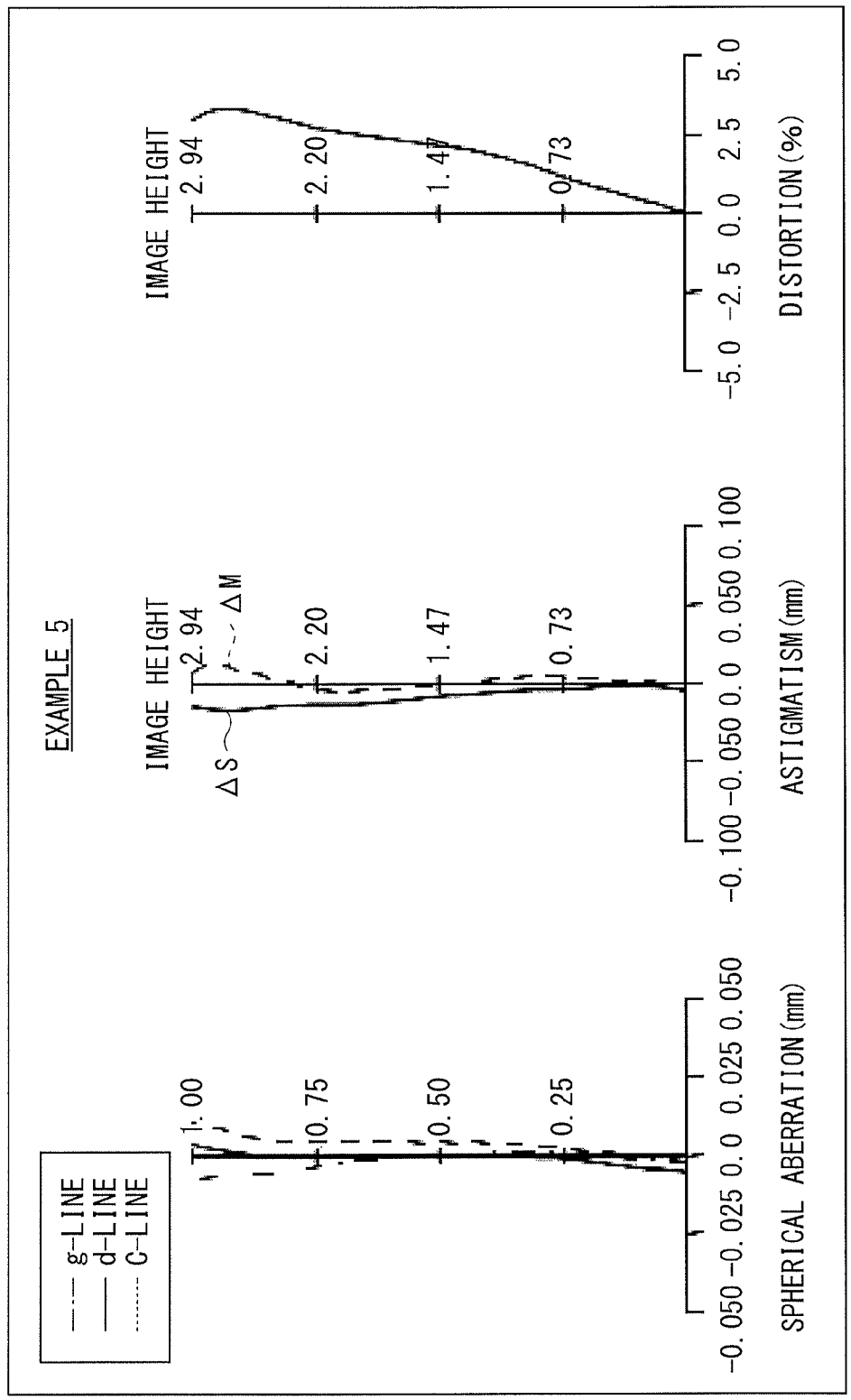

[ FIG. 14 ]
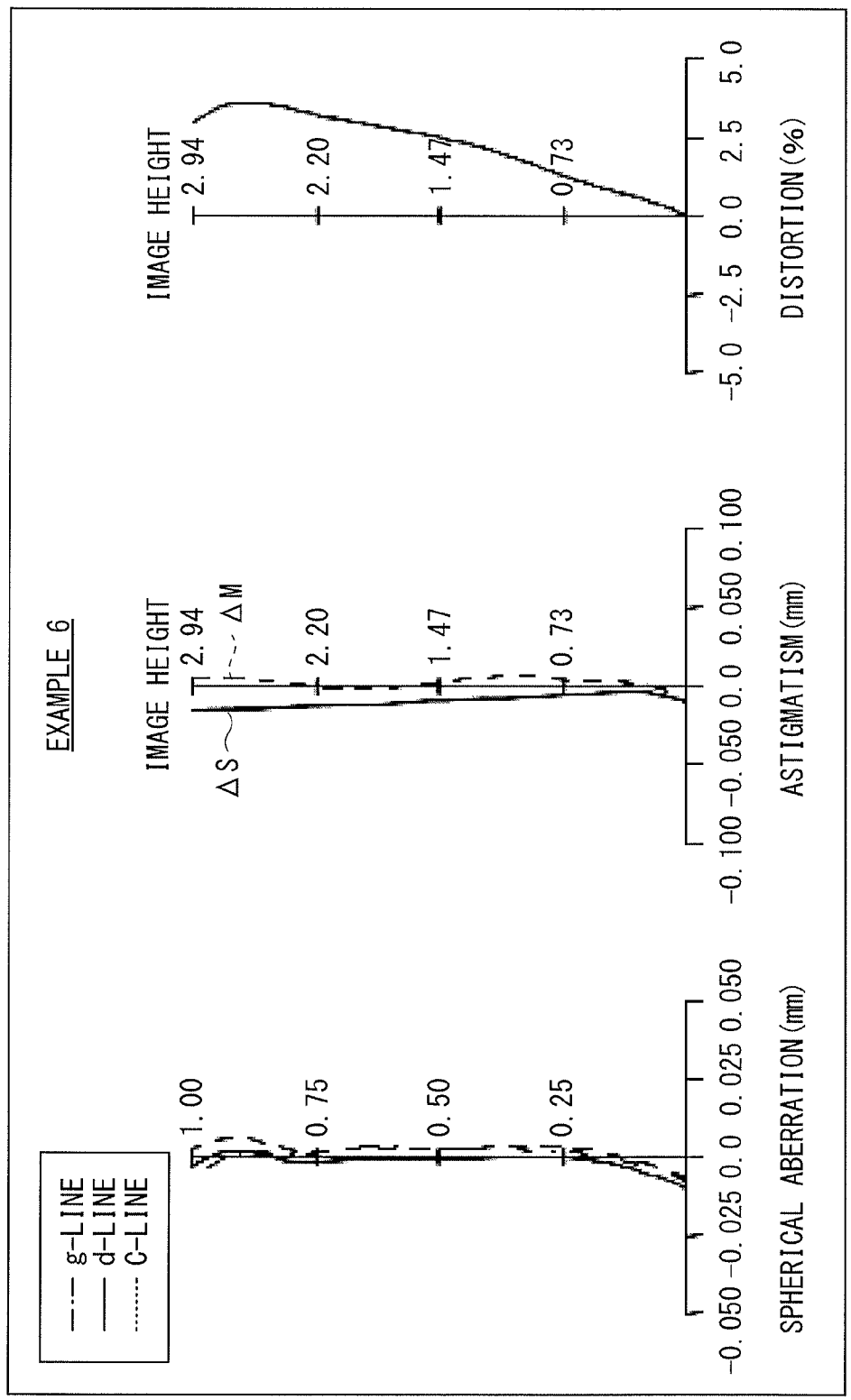

[ FIG. 15 ]
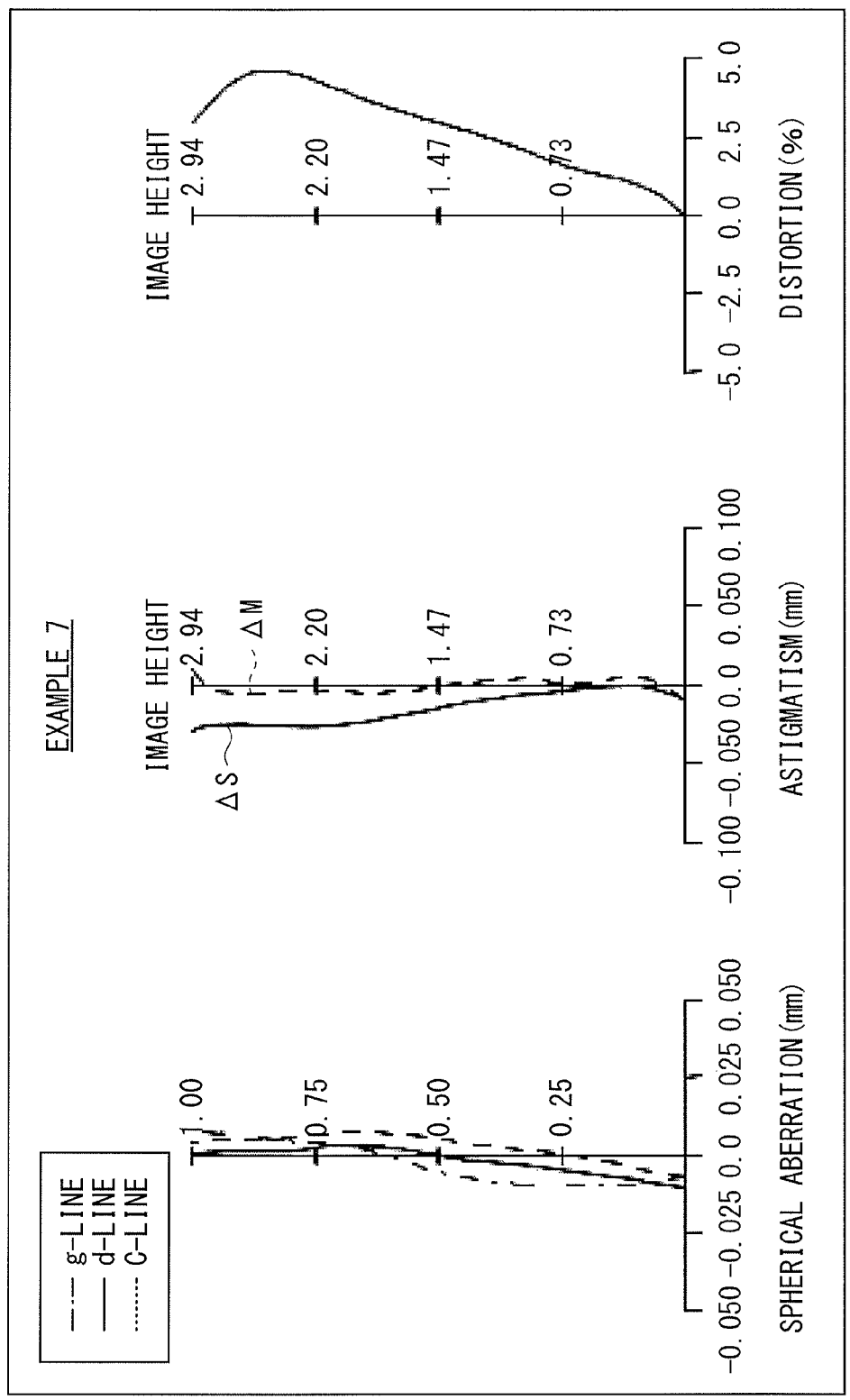

[ FIG. 16 ]
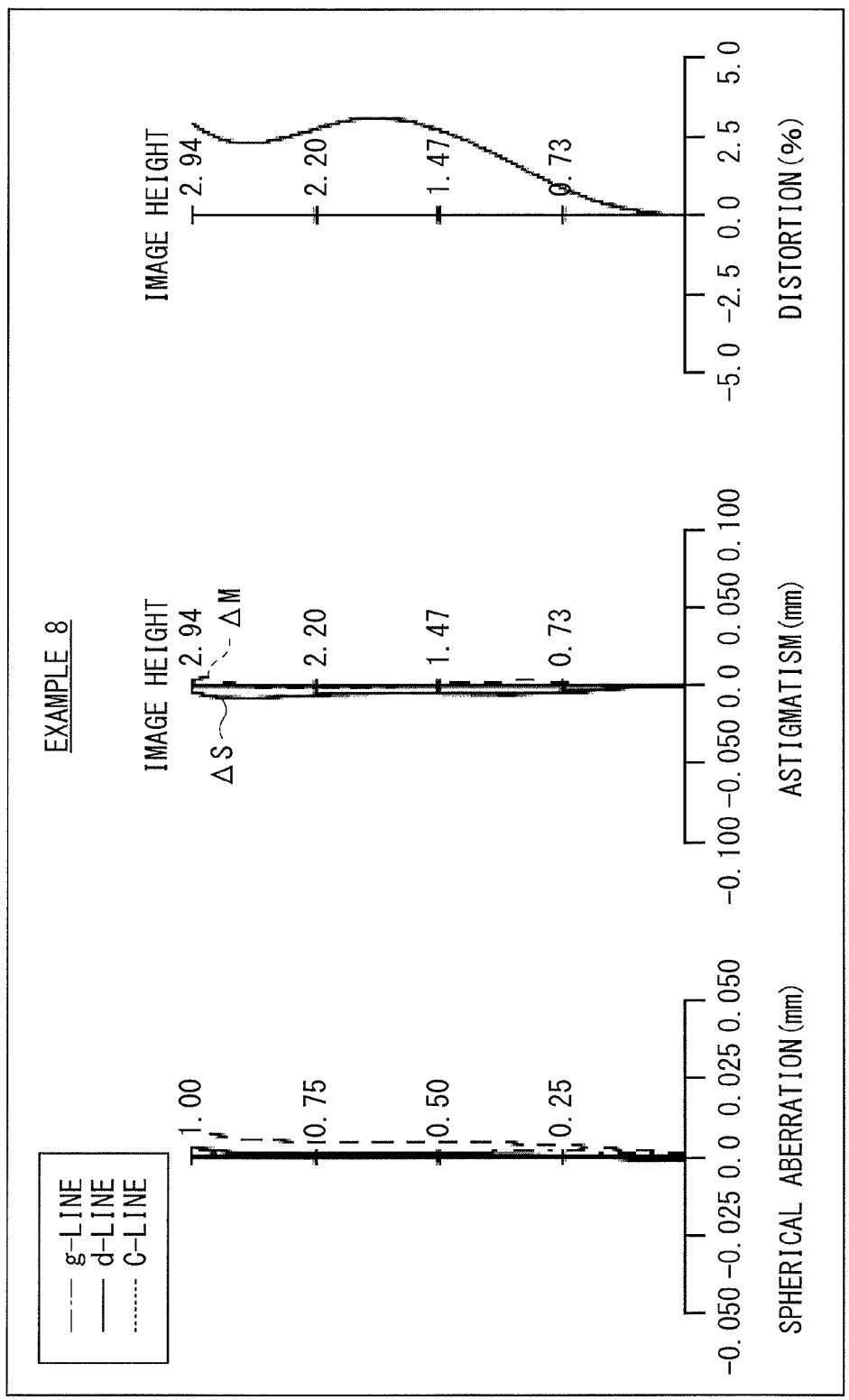

[ FIG. 17 ]
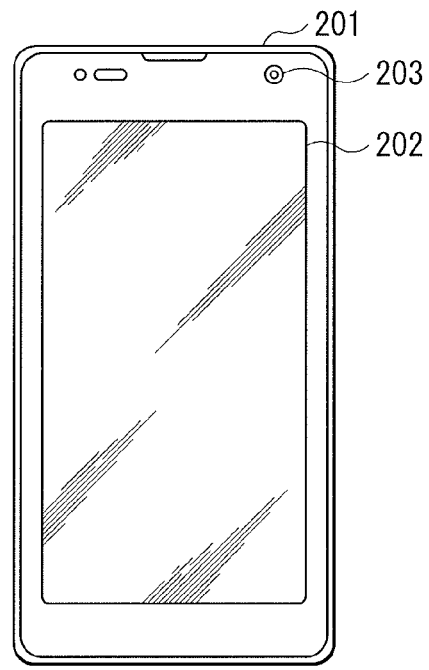
[ FIG. 18 ]
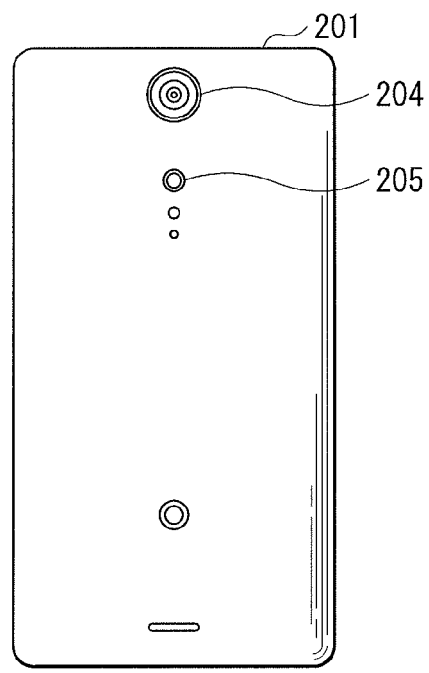

BRIGHT LARGE APERTURE IMAGING LENS AND IMAGING UNIT

TECHNICAL FIELD

The present disclosure relates to a bright large-aperture imaging lens that is suitable for a small imaging unit using an imaging device such as CCD (Charge Coupled Devices) and CMOS (Complementary Metal Oxide Semiconductor), for example, a digital still camera and a mobile phone provided with a camera, and an imaging unit using such an imaging lens.

BACKGROUND ART

A mobile phone provided with a camera and a digital still camera each using a solid-state imaging device such as a CCD and a CMOS are known. In such imaging units, further reduction in size has been desired, and in a lens for shooting to be mounted thereon, further reduction in size and reduction in total length have been desired.

Moreover, recently, in a small imaging unit such as a mobile phone provided with a camera, both reduction in size and an increase in the number of pixels have been achieved, and a model including an imaging device having a large number of pixels, for example, having ten million pixels or more has been widely used. Accordingly, an imaging lens having high lens performance corresponding to such a solid-state imaging unit having a large number of pixels has been desired.

Meanwhile, in the imaging unit, a bright lens with a larger aperture has been desired in order to prevent a decrease in sensitivity of the imaging device and an increase in noise that are accompanied by reduction in cell pitch. An imaging lens having a five-lens configuration is currently mainstream as such a small high-performance imaging lens, and, for example, image lenses described in Patent Literatures 1 and 2 are known.

CITATION LIST

Patent Literature

Patent Literature 1: Japanese Unexamined Patent Application Publication No. 2007-264180
Patent Literature 2: Japanese Unexamined Patent Application Publication No. 2010-048996

SUMMARY OF INVENTION

The foregoing lenses described in Patent Literatures 1 and 2 are imaging lenses having a five-lens configuration corresponding to the current imaging device having a large number of pixels, and secure a small size and high optical performance by correcting various aberrations in a balanced manner while suppressing a total optical length. However, these imaging lenses are optimized with an Fno of about 2.2, and when an aperture of this configuration is increased to an Fno of about 1.6, spherical aberration that is on-axial aberration, coma aberration that is off-axial aberration, and field curvature are insufficient; therefore, it is difficult to secure necessary optical performance. Moreover, in order to further improve optical performance, it is necessary to further suppress on-axial chromatic aberration; however, it is difficult to correct the on-axial chromatic aberration while suppressing the total optical length in this configuration, and it is also difficult to secure high resolution performance necessary to increase the aperture. Therefore, development of a bright imaging lens with a large aperture of, for example, an Fno from about 1.6 to about 2.2 both inclusive is desired.

Therefore, it is desirable to provide an imaging lens and an imaging unit that have favorable optical performance corresponding to a small imaging device having a large number of pixels.

An imaging lens according to an embodiment of the present disclosure includes: a first lens having positive refractive power; a second lens having positive refractive power; a third lens having negative refractive power; a fourth lens having positive refractive power; a fifth lens having negative refractive power; and a sixth lens having positive or negative refractive power in vicinity of an optical axis, a peripheral portion of a surface on an image side of the sixth lens including one or more inflection points, the first to sixth lenses being provided in order from an object side.

An imaging unit according to an embodiment of the present disclosure includes: an imaging lens; and an imaging device configured to output an imaging signal based on an optical image formed by the imaging lens, the imaging lens being configured of the imaging lens according to the above-described embodiment of the present disclosure.

In the imaging lens and the imaging unit according to the above-described embodiments of the present disclosure, a six-lens configuration is provided as a whole, and a configuration of each lens is optimized.

According to the imaging lens or the imaging unit according to the above-described embodiment of the present disclosure, the six-lens configuration is provided as a whole, and the configuration of each lens is optimized; therefore, it is possible to achieve favorable optical performance corresponding to a small imaging device having a large number of pixels.

BRIEF DESCRIPTION OF DRAWINGS

FIG. 1 illustrates a first configuration example of an imaging lens according to an embodiment of the present disclosure, and is a lens cross-sectional view corresponding to Numerical Example 1.

FIG. 2 illustrates a second configuration example of the imaging lens, and is a lens cross-sectional view corresponding to Numerical Example 2.

FIG. 3 illustrates a third configuration example of the imaging lens, and is a lens cross-sectional view corresponding to Numerical Example 3.

FIG. 4 illustrates a fourth configuration example of the imaging lens, and is a lens cross-sectional view corresponding to Numerical Example 4.

FIG. 5 illustrates a fifth configuration example of the imaging lens, and is a lens cross-sectional view corresponding to Numerical Example 5.

FIG. 6 illustrates a sixth configuration example of the imaging lens, and is a lens cross-sectional view corresponding to Numerical Example 6.

FIG. 7 illustrates a seventh configuration example of the imaging lens, and is a lens cross-sectional view corresponding to Numerical Example 7.

FIG. 8 illustrates an eighth configuration example of the imaging lens, and is a lens cross-sectional view corresponding to Numerical Example 8.

FIG. 9 illustrates first various aberrations of the imaging lens, and is a characteristic curve diagram of the lens corresponding to Numerical Example 1.

FIG. 10 illustrates second various aberrations of the imaging lens, and is a characteristic curve diagram of the lens corresponding to Numerical Example 2.

FIG. 11 illustrates third various aberrations of the imaging lens, and is a characteristic curve diagram of the lens corresponding to Numerical Example 3.

FIG. 12 illustrates fourth various aberrations of the imaging lens, and is a characteristic curve diagram of the lens corresponding to Numerical Example 4.

FIG. 13 illustrates fifth various aberrations of the imaging lens, and is a characteristic curve diagram of the lens corresponding to Numerical Example 5.

FIG. 14 illustrates sixth various aberrations of the imaging lens, and is a characteristic curve diagram of the lens corresponding to Numerical Example 6.

FIG. 15 illustrates seventh various aberrations of the imaging lens, and is a characteristic curve diagram of the lens corresponding to Numerical Example 7.

FIG. 16 illustrates eighth various aberrations of the imaging lens, and is a characteristic curve diagram of the lens corresponding to Numerical Example 8.

FIG. 17 is a front view of a configuration example of an imaging unit.

FIG. 18 is a back view illustrating a configuration of the imaging unit.

MODE FOR CARRYING OUT THE INVENTION

Some embodiments of the present disclosure will be described below in detail with reference to the accompanying drawings. It is to be noted that description will be given in the following order.

1. Basic Configuration of Lens
2. Functions and Effects
3. Example of Application to Imaging Unit
4. Numerical Examples of Lens
5. Other Embodiments 1. Basic Configuration of Lens FIG. 1 illustrates a first configuration example of an imaging lens according to an embodiment of the present disclosure. The first configuration example corresponds to a lens configuration of Numerical Example 1 that will be described later. Similarly, FIGS. 2 to 8 illustrate cross-sectional configurations of second to eighth configuration examples corresponding to lens configurations of Numerical Examples 2 to 8, respectively, that will be described later. In FIGS. 1 to 8, the reference sign "Simg" denotes image plane (or an imaging device), and the reference sign "Z1" denotes an optical axis.

The imaging lens according to this embodiment substantially includes six lenses, i.e., a first lens L1, a second lens L2, a third lens L3, a fourth lens L4, a fifth lens L5 and a sixth lens L6 that are provided in order from an object side along the optical axis Z1.

The first lens L1 has positive refractive power. The second lens L2 has positive refractive power. The third lens L3 has negative refractive power. The fourth lens L4 has positive refractive power. The fifth lens L5 has negative refractive power.

The sixth lens L6 has positive or negative refractive power in vicinity of the optical axis. A surface on an image side of the sixth lens L6 has an aspherical shape including one or more inflection points in a peripheral portion thereof and having a concave-convex shape varying in a way from a central portion to the peripheral portion.

An aperture stop St may be preferably disposed on an object side of a surface on the image-side surface of the second lens L2. All of the first to sixth lenses L1 to L6 may be preferably made of a resin.

In addition thereto, the imaging lens according to this embodiment may preferably satisfy predetermined conditional expressions and the like that will be described later.

2. Functions and Effects

Next, functions and effects of the imaging lens according to this embodiment will be described.

This imaging lens has a six-lens configuration as a whole, and the configuration of each lens is optimized; therefore, it is possible to achieve favorable optical performance corresponding to a small imaging device having a large number of pixels. In particular, by adopting an power arrangement of positive, positive, negative, positive, negative, and negative (or positive) in order from the object side, while a total optical length is suppressed, spherical aberration that is on-axial aberration, coma aberration that is off-axial aberration, and a field curvature that may be an issue when the aperture is increased are corrected in a balanced manner. Moreover, since the surface on the image-side of the sixth lens L6 is an aspherical surface including one or more inflection points in the peripheral portion thereof, light rays are allowed to enter the imaging device at an appropriate angle, and the imaging lens is allowed to correspond to an imaging device having a large number of pixels. In particular, the imaging lens is effective in correction of the field curvature.

Further, by configuring all of the first to sixth lenses L1 to L6 of lenses made of an inexpensive resin, it is possible to suppress variation in the field curvature which may be an issue when temperature varies, while securing mass productivity.

(Description of Conditional Expressions)

In the imaging lens according to this embodiment, more favorable performance is allowed to be obtained by optimizing the configuration of each lens so as to satisfy at least one of the following conditional expressions, preferably, a combination of two or more of the following conditional expressions. In particular, it is possible to achieve a small large-aperture imaging lens having favorable optical performance corresponding to the imaging device having a large number of pixels.

$$\nu d3 < 30 \tag{1}$$

$$\nu d5 > 20 \tag{2}$$

where vd3 is an Abbe number of the third lens L3 at d-line, and vd5 is an Abe number of the fifth lens L5 at d-line.

The conditional expressions (1) and (2) define the Abbe numbers of the third lens L3 and the fifth lens L5 at d-line, and are conditions for favorably correcting chromatic aberration that occurs in a lens system. When the Abbe numbers of the third lens L3 and the fifth lens L5 are out of the ranges of values specified by the conditional expressions (1) and (2), it is difficult to correct on-axial chromatic aberration and chromatic aberration of magnification that are necessary for increasing the aperture up to an Fno of about 1.6.

$$\nu d1 > 50 \tag{3}$$

$$\nu d2 > 50 \tag{4}$$

$$\nu d4 > 50 \tag{5}$$

$$\nu d6 > 50 \tag{6}$$

where νd1 is an Abbe number of the first lens L1 at d-line, νd2 is an Abbe number of the second lens L2 at d-line, νd4 is an Abbe number of the fourth lens L4 at d-line, and νd6 is an Abbe number of the sixth lens L6 at d-line.

The conditional expressions (3) to (6) define the Abbe numbers of the first lens L1, the second lens L2, the fourth lens L4, and the sixth lens L6 at d-line, and are conditions for favorably correcting chromatic aberration that occurs in the lens system. When the Abbe numbers of the first lens L1, the second lens L2, the fourth lens L4, and the sixth lens L6 are out of the ranges of values specified by the conditional expressions (3) to (6), it is difficult to correct on-axial chromatic aberration and chromatic aberration of magnification in a balanced manner.

$$0 < f/f2 < 1.1 \tag{7}$$

where f is a total focal length of the imaging lens, and f2 is a focal length of the second lens L2.

The conditional expression (7) defines a ratio of the focal length of the second lens 12 to the total focal length of the imaging lens, and limits balance of refractive power. When the conditional expression (7) is satisfied, it is possible to achieve securing of favorable optical performance and suppression of the total optical length. When a value of f/f2 is larger than the upper limit in the conditional expression (7), it is difficult to correct on-axial chromatic aberration. On the other hand, when the value of f/f2 is smaller than the lower limit in the conditional expression (7), it is difficult to correct high-order spherical aberration or coma aberration, and it is difficult to achieve reduction in size and an increase in aperture desired of this lens system.

It is to be noted that in order to achieve correction of on-axial chromatic aberration and correction of spherical aberration and coma aberration in a more balanced manner, the numerical range in the conditional expression (7) may be desirably set to a range shown in the following conditional expression (7)'.

$$0 < f/f2 < 1.0 \tag{7)'}$$

$$-1.35 < f/f3 \le -0.66 \tag{8}$$

where f3 is a focal length of the third lens L3.

A conditional expression (8) relates to an appropriate focal length of the third lens L3. When a value of f/f3 is smaller than the upper limit in the conditional expression (8), it is possible to moderately correct on-axial and off-axial chromatic aberrations. On the other hand, when the value of f/f3 is larger than the lower limit, it is possible to make the power of the third lens L3 weaker, and to reduce manufacturing error sensitivity during assembly.

$$-0.7 < f/f5 < 0 \tag{9}$$

where f5 is a focal length of the fifth lens L5.

A conditional expression (9) defines a ratio of the focal length of the fifth lens L5 to the total focal length of the imaging lens, and limits the balance of refractive power. When the conditional expression (9) is satisfied, it is possible to achieve securing of favorable optical performance and suppression of the total optical length. When a value of f/f5 is larger than the upper limit in the conditional expression (9), it is difficult to reduce the total optical length. On the other hand, when the value of f/f5 is smaller than the lower limit in the conditional expression (9), it is advantageous to reduction in the total optical length; however, it is difficult to correct off-axial aberration, and it is difficult to achieve favorable optical performance desired of this lens system.

It is to be noted that in order to achieve reduction in the total optical length and correction of off-axial aberration in a more balanced manner, the numerical range in the conditional expression (9) may be desirably set to a range shown in the following conditional expression (9)'.

$$-0.65 < f/f5 < 0 \tag{9)'}$$

$$-1.2 < f/f6 < 0.2 \tag{10}$$

where f6 is a focal length of the sixth lens L6.

A conditional expression (10) defines a ratio of the focal length of the sixth lens L6 to the total focal length of the imaging lens, and limits balance of refractive power. When the conditional expression (10) is satisfied, it is possible to achieve securing of favorable optical performance and suppression of the total optical length. When a value of f/f6 is larger than the upper limit in the conditional expression (10), it is advantageous to reduction in the total optical length; however, it is difficult to secure favorable optical performance. On the other hand, when the value of f/f6 is smaller than the lower limit in the conditional expression (10), it is advantageous to aberration correction; however, the total optical length is increased, and it is difficult to achieve reduction in size desired of the lens system.

It is to be noted that in order to achieve reduction in the total optical length and performance of an intermediate image height in a more balanced manner, the numerical range in the conditional expression (10) may be desirably set to a range shown in the following conditional expression (10)'.

$$-1.1 < f/f6 < 0.1 \tag{10)'}$$

$$-12 < f2/f3 < -0.1 \tag{11}$$

A conditional expression (11) defines a ratio of the focal length of the second lens L2 to the focal length of the third lens L3, and limits balance of refractive power. By so setting a value of f2/f3 as to satisfy the conditional expression (11), securing of favorable optical performance and suppression of the total optical length are achieved. When the value of f2/f3 is larger than the upper limit in the conditional expression (11), it is advantageous to aberration correction; however, sensitivity of assembly is increased, and it is difficult to secure favorable optical performance. On the other hand, when the value of f2/f3 is smaller than the lower limit in this conditional expression, it is difficult to correct high-order spherical aberration or coma aberration, and it is difficult to achieve reduction in size and an increase in aperture desired of this lens system.

It is to be noted that in order to achieve sensitivity of assembly and correction of spherical aberration and coma aberration in a more balanced manner, the numerical range in the conditional expression (11) may be desirably set to a range shown in the following conditional expression (11)'.

$$-11 < f2/f3 < -1 \tag{11)'}$$

$$0 < f2/f1 < 18 \tag{12}$$

where f1 is the focal length of the first lens L1.

A conditional expression (12) defines a ratio of the focal length of the second lens L2 to the focal length of the first lens L1, and limits balance of refractive power. By so setting a value of f2/f1 as to satisfy the conditional expression (12), it is possible to achieve securing of favorable optical performance and suppression of the total optical length. When the value of f2/f1 is larger than the upper limit in the conditional expression (12), it is difficult to correct high-order spherical aberration or coma aberration, and it is difficult to achieve reduction in size and an increase in aperture desired of this lens system. On the other hand, when the value of f2/f1 is smaller than the lower limit in this conditional expression, it is advantageous to aberration correction; however, sensitivity of assembly is increased, and it is difficult to secure favorable optical performance.

It is to be noted that in order to achieve sensitivity of assembly and correction of spherical aberration and coma aberration in a more balanced manner, the numerical range in the conditional expression (12) may be desirably set to a range shown in the following conditional expression (12)'.

$$0.5 < f2/f1 < 16 \quad (12)'$$

Moreover, when the following conditional expression (13) is satisfied, it is possible to achieve securing of favorable optical performance and suppression of the total optical length.

$$-1 < f5/f6 < 19 \quad (13)$$

The conditional expression (13) defines a ratio of the focal length of the fifth lens L5 to the focal length of the six lens L6, and limits balance of refractive power. When a value of f5/f6 is larger than the upper limit in the conditional expression (13), it is advantageous to aberration correction; however, the total optical length is increased, and it is difficult to achieve reduction in size desired of this lens system. On the other hand, when the value of f5/f6 is smaller than the lower limit in this conditional expression, it is advantageous to reduction in the total optical length; however, it is difficult to correct off-axial aberration, and it is difficult to achieve favorable optical performance desired of this lens system.

It is to be noted that in order to achieve reduction in the total optical length and correction of off-axial chromatic aberration and off-axial coma aberration in a more balanced manner, the numerical range in the conditional expression (13) may be desirably set to a range shown in the following conditional expression (13)'.

$$-0.5 < f5/f6 < 17 \quad (13)'$$

3. Example of Application to Imaging Unit

FIGS. 17 and 18 illustrate a configuration example of an imaging unit to which the imaging lens according to this embodiment is applied. This configuration example is an example of a mobile terminal apparatus (such as a mobile information terminal and a mobile phone terminal) that includes the imaging unit. This mobile terminal apparatus includes a housing 201 with a substantially-rectangular shape. A display section 202 and a front camera section 203 are provided on a front surface side of the housing 201 (FIG. 17). A main camera section 204 and a camera flash 205 are provided on a back surface side of the housing 201 (FIG. 18).

The display section 202 may be, for example, a touch panel that allows various kinds of operation by detecting a contact state on a surface thereof. Thus, the display section 202 has a function of displaying various kinds of information and an input function that allows for various kinds of input operation by a user. The display section 202 may display, for example, an operation state, various kinds of data such as an image taken by the front camera section 203 or the main camera section 204, and/or the like.

The imaging lens according to this embodiment may be applicable, for example, as a lens for a camera module in the imaging unit (the front camera section 203 or the main camera section 204) in the mobile terminal apparatus as illustrated in FIGS. 17 and 18. When the imaging lens according to this embodiment is used as such a lens for a camera module, an imaging device such as a CCD (Charge Coupled Device) and a CMOS (Complementary Metal Oxide Semiconductor) that outputs an imaging signal (image signal) based on an optical image formed by the imaging lens is provided in vicinity of the image plane Simg of the imaging lens. In this case, as illustrated in FIG. 1, for example, seal glass SG for protecting the imaging device, an optical member such as various optical filters, and/or the like may be provided between the sixth lens L6 and the image plane Simg.

It is to be noted that the imaging lens according to this embodiment is not limited to the above-described mobile terminal apparatus, and is also applicable as an imaging lens for other electronic apparatuses, for example, a digital still camera and a digital video camera. Moreover, the imaging lens according to this embodiment may be applicable to general small imaging units that use a solid-state imaging device such as a CCD and a CMOS, for example, an optical sensor, a mobile module camera, a web camera, and/or the like.

EXAMPLES

4. Numerical Examples of Lens

Next, specific numerical examples of the imaging lens according to this embodiment will be described.

It is to be noted that symbols etc. in tables and the description below represent the following. "Si" represents the number of an i-th surface counted from the most object side. It is to be noted that "ASP" in the surface number Si indicates that the relevant surface is an aspherical surface. "Ri" represents a value (mm) of a paraxial radius of curvature of the i-th surface. "di" represents a value (mm) of a spacing on the optical axis between the i-th surface and an (i+1)th surface. "ni" represents a value of a refractive index of d-line (having a wavelength of 587.6 nm) of a material of an optical member that has the i-th surface. "vi" represents a value of an Abbe number, at d-line, of the material of the optical member that has the i-th surface. A value of "∞" in the radius of curvature indicates that the relevant surface is a planar surface. "STO" in "Surface No." indicates that the relevant surface is an aperture stop surface. "IMG" indicates that the relevant surface is the image plane. "f" represents a total focal length of the imaging lens, "2ω" represents a total diagonal angle of view, and "FNo" represents an F number.

In each example, a shape of an aspherical surface is represented by the following expression. In data of aspherical surface coefficients, the symbol "E" indicates that a numerical value after the symbol "E" is a "power exponent" having 10 as a base, and indicates that a numerical value before "E" is multiplied by the numerical value represented by the exponential function having 10 as a base. To give an example, "1.0E-05" represents "1.0×10$^{-5}$".

(Expression of Aspherical Surface)

$$Z=(Y^2/R)/[1+\{1-(1+K)(Y^2/R^2)\}^{1/2}]+AY^3+BY^4+CY^5+DY^6+EY^7+FY^8+GY^9+HY^{10}+IY^{11}+JY^{12}$$

where Z is a depth of an aspherical surface, Y is a height from an optical axis, R is a paraxial radius of curvature, K is a conical constant, and A, B, C, D, E, F, G, H, I, and J are third-order, fourth-order, fifth-order, sixth-order, seventh-order, eighth-order, ninth-order, tenth-order, eleventh-order, and twelfth-order aspheric coefficients, respectively.

(Configuration Common to Respective Numerical Examples)

Each of imaging lenses according to the respective numerical examples below has a configuration that satisfies the above-described basic configuration of the lens. Moreover, in each of the imaging lenses according to the respective numerical examples, each of the lens surfaces of the first lens L1 to the sixth lens L6 is aspherical. The seal glass SG is provided between the sixth lens L6 and the image plane Simg.

Numerical Example 1

[Table 1] and [Table 2] each illustrate specific lens data corresponding to the imaging lens according to the first configuration example illustrated in FIG. 1. In particular, [Table 1] illustrates basic lens data thereof, and [Table 2] illustrates data related to the aspherical surfaces.

In this first configuration example, the first lens L1 has a biconvex shape in vicinity of the optical axis. The second lens L2 has a positive meniscus lens that has a convex surface facing toward the image side in vicinity of the optical axis. The third lens L3 is a negative lens having a concave shape on the image side in vicinity of the optical axis. The fourth lens L4 is a positive lens having a convex shape on the image side in vicinity of the optical axis. The fifth lens L5 is a negative meniscus lens that has a concave surface facing toward the image side in vicinity of the optical axis. The sixth lens L6 is a negative meniscus lens that has a concave surface facing toward the image side in vicinity of the optical axis. The aperture stop St is provided in vicinity of the surface on the object side of the first lens L1.

Values of the F number, the total diagonal angle of view $2\omega$, and the total focal length f of the imaging lens are as follows.

$FNo=1.6$ $f=4.17$ $2\omega=68.6°$

TABLE 1

| | Example 1 | | | |
|---|---|---|---|---|
| Si | Ri | di | ni | vi |
| 1 | (STO) | 0.000 | | |
| 2(ASP) | 3.314 | 0.868 | 1.531 | 55.7 |
| 3(ASP) | −3.571 | 0.040 | | |
| 4(ASP) | −4.106 | 0.868 | 1.531 | 55.7 |
| 5(ASP) | −3.833 | 0.040 | | |
| 6(ASP) | 5.908 | 0.455 | 1.650 | 21.5 |
| 7(ASP) | 2.109 | 0.577 | | |
| 8(ASP) | −4.989 | 0.884 | 1.531 | 55.7 |
| 9(ASP) | −1.722 | 0.040 | | |
| 10(ASP) | 3.998 | 0.576 | 1.650 | 21.5 |
| 11(ASP) | 2.169 | 0.295 | | |
| 12(ASP) | 1.809 | 0.520 | 1.531 | 55.7 |
| 13(ASP) | 1.308 | 0.276 | | |
| 14 | ∞ | 0.110 | 1.517 | 64.2 |
| 15 | ∞ | 0.540 | | |
| 16 | (IMG) | 0.010 | | |

TABLE 2

| | Example 1 | | | | |
|---|---|---|---|---|---|
| Si | K | A | B | C | D | E |
| 2 | −13.8950 | 0 | 2.339E−02 | 0 | −2.902E−02 | 0 |
| 3 | −0.0772 | 0 | 5.556E−02 | 0 | −5.865E−02 | 0 |
| 4 | −25.9425 | −2.769E−03 | 7.486E−02 | −1.940E−03 | −4.073E−02 | 2.009E−03 |
| 5 | −25.8106 | 2.311E−02 | −2.488E−02 | −1.232E−02 | 1.537E−02 | 8.323E−03 |
| 6 | −11.4473 | 2.292E−02 | −1.002E−01 | −3.906E−03 | −8.576E−03 | 0 |
| 7 | −3.0675 | 0 | −5.502E−02 | 0 | 1.602E−04 | 0 |
| 8 | −6.2159 | 0 | 7.125E−02 | 0 | −2.216E−02 | 0 |
| 9 | −7.6795 | 0 | −3.158E−02 | 0 | 1.256E−02 | 0 |
| 10 | 0.9215 | −1.328E−02 | 2.152E−03 | 0 | −1.601E−02 | 0 |
| 11 | −16.9686 | −8.758E−02 | 8.905E−02 | −3.583E−02 | −1.088E−05 | −2.448E−03 |
| 12 | −4.6959 | −1.444E−01 | −7.818E−02 | 0 | 3.780E−02 | 0 |
| 13 | −5.5565 | 0 | −7.645E−02 | 0 | 2.242E−02 | 0 |

| | F | G | H | I | J |
|---|---|---|---|---|---|
| 2 | 4.039E−03 | 0 | −2.026E−03 | 0 | 0 |
| 3 | 1.832E−02 | 0 | −3.046E−03 | 0 | 0 |
| 4 | 1.871E−02 | −7.832E−04 | −3.457E−03 | −8.638E−05 | 2.961E−04 |
| 5 | 1.346E−02 | 2.054E−03 | −1.430E−02 | −5.064E−04 | 2.440E−03 |
| 6 | 4.594E−02 | 0 | −2.272E−02 | 0 | 3.311E−03 |
| 7 | 1.292E−02 | 0 | −6.548E−03 | 0 | 1.013E−03 |
| 8 | −5.735E−04 | 0 | 1.199E−03 | 0 | −6.970E−05 |
| 9 | −1.638E−03 | 0 | −1.201E−03 | 0 | 5.119E−04 |
| 10 | 3.639E−03 | 0 | −1.255E−03 | 0 | 1.186E−04 |
| 11 | 4.813E−04 | −3.153E−04 | 4.342E−04 | 5.554E−05 | −6.207E−05 |
| 12 | −4.219E−03 | 0 | 7.105E−05 | 0 | 8.681E−06 |
| 13 | −3.471E−03 | 0 | 2.996E−04 | 0 | −1.222E−05 |

Numerical Example 2

[Table 3] and [Table 4] each illustrate specific lens data corresponding to the imaging lens according to the second configuration example illustrated in FIG. 2. In particular, [Table 3] illustrates basic lens data thereof, and [Table 4] illustrates data related to the aspherical surfaces.

In this second configuration example, the first lens L1 has a biconvex shape in vicinity of the optical axis. The second lens L2 has a positive meniscus lens that has a convex surface facing toward the image side in vicinity of the optical axis. The third lens L3 is a negative lens having a concave shape on the image side in vicinity of the optical axis. The fourth lens L4 is a positive lens having a convex shape on the image side in vicinity of the optical axis. The fifth lens L5 is a negative meniscus lens that has a concave surface facing toward the image side in vicinity of the optical axis. The sixth lens L6 is a positive meniscus lens that has a concave surface facing toward the image side in vicinity of the optical axis. The aperture stop St is provided in vicinity of the surface on the object side of the first lens L1.

Values of the F number, the total diagonal angle of view $2\omega$, and the total focal length f of the imaging lens are as follows.

$FNo = 1.6$ $f = 3.91$ $2\omega = 72.06°$

TABLE 3

Example 2

| Si | Ri | di | ni | vi |
|---|---|---|---|---|
| 1 | (STO) | 0.000 | | |
| 2(ASP) | 3.588 | 0.811 | 1.531 | 55.7 |
| 3(ASP) | −3.305 | 0.040 | | |
| 4(ASP) | −3.687 | 0.751 | 1.531 | 55.7 |
| 5(ASP) | −3.421 | 0.040 | | |
| 6(ASP) | 6.055 | 0.480 | 1.644 | 22.2 |
| 7(ASP) | 2.091 | 0.545 | | |
| 8(ASP) | −5.003 | 0.932 | 1.531 | 55.7 |
| 9(ASP) | −1.801 | 0.040 | | |
| 10(ASP) | 2.918 | 0.536 | 1.650 | 21.5 |
| 11(ASP) | 1.637 | 0.261 | | |
| 12(ASP) | 1.230 | 0.520 | 1.531 | 55.7 |
| 13(ASP) | 1.074 | 0.322 | | |
| 14 | ∞ | 0.110 | 1.517 | 64.2 |
| 15 | ∞ | 0.540 | | |
| 16 | (IMG) | 0.010 | | |

TABLE 4

Example 2

| Si | K | A | B | C | D | E |
|---|---|---|---|---|---|---|
| 2 | −15.5437 | 0 | 1.484E−02 | 0 | −3.055E−02 | 0 |
| 3 | 0.2485 | 0 | 5.434E−02 | 0 | −5.971E−02 | 0 |
| 4 | −19.4957 | 5.241E−04 | 7.354E−02 | −2.213E−03 | −4.046E−02 | 2.035E−03 |
| 5 | −17.7294 | 2.094E−02 | −2.798E−02 | −1.368E−02 | 1.485E−02 | 8.275E−03 |
| 6 | −19.3348 | 2.006E−02 | −1.030E−01 | −5.083E−03 | −8.858E−03 | 0 |
| 7 | −3.0231 | 0 | −5.550E−02 | 0 | −5.608E−04 | 0 |
| 8 | −6.0374 | 0 | 7.275E−02 | 0 | −2.101E−02 | 0 |
| 9 | −6.3561 | 0 | −3.821E−02 | 0 | 1.528E−02 | 0 |
| 10 | 0.9839 | −3.768E−02 | −6.756E−04 | 0 | −1.451E−02 | 0 |
| 11 | −9.3941 | −1.259E−01 | 1.210E−01 | −3.951E−02 | −2.098E−03 | −3.1601E−03 |
| 12 | −4.3455 | −1.377E−01 | −8.158E−02 | 0 | 3.731E−02 | 0 |
| 13 | −4.6870 | 0 | −8.543E−02 | 0 | 2.454E−02 | 0 |

| Si | F | G | H | I | J |
|---|---|---|---|---|---|
| 2 | 4.755E−03 | 0 | −3.077E−03 | 0 | 0 |
| 3 | 1.846E−02 | 0 | −3.447E−03 | 0 | 0 |
| 4 | 1.870E−02 | −8.487E−04 | −3.488E−03 | −1.307E−04 | 2.605E−04 |
| 5 | 1.363E−02 | 2.196E−03 | −1.427E−02 | −5.077E−04 | 2.449E−03 |
| 6 | 4.641E−02 | 0 | −2.252E−02 | 0 | 3.354E−03 |
| 7 | 1.261E−02 | 0 | −6.546E−03 | 0 | 1.047E−03 |
| 8 | −3.364E−04 | 0 | 1.218E−03 | 0 | −7.855E−05 |
| 9 | −1.133E−03 | 0 | −1.230E−03 | 0 | 5.372E−04 |
| 10 | 3.050E−03 | 0 | −1.357E−03 | 0 | 1.340E−04 |
| 11 | 4.838E−04 | −2.189E−04 | 4.716E−04 | 6.448E−05 | −6.456E−05 |
| 12 | −4.066E−03 | 0 | 8.000E−05 | 0 | 6.717E−06 |
| 13 | −3.639E−03 | 0 | 2.969E−04 | 0 | −1.149E−05 |

Numerical Example 3

[Table 5] and [Table 6] each illustrate specific lens data corresponding to the imaging lens according to the third configuration example illustrated in FIG. 3. In particular, [Table 5] illustrates basic lens data thereof, and [Table 6] illustrates data related to the aspherical surfaces.

In this third configuration example, the first lens L1 has a biconvex shape in vicinity of the optical axis. The second lens L2 has a positive meniscus lens that has a convex surface facing toward the image side in vicinity of the optical axis. The third lens L3 is a negative lens having a concave shape on the image side in vicinity of the optical axis. The fourth lens L4 is a positive lens having a convex shape on the image side in vicinity of the optical axis. The fifth lens L5 is a negative meniscus lens that has a concave surface facing toward the image side in vicinity of the optical axis. The sixth lens L6 is a negative meniscus lens that has a concave surface facing toward the image side in vicinity of the optical axis. The aperture stop St is provided in vicinity of the surface on the object side of the first lens L1.

Values of the F number, the total diagonal angle of view $2\omega$, and the total focal length f of the imaging lens are as follows.

$FNo = 1.6$ $f = 3.91$ $2\omega 72.18°$

TABLE 5

Example 3

| Si | Ri | di | ni | vi |
|---|---|---|---|---|
| 1 | (STO) | 0.000 | | |
| 2(ASP) | 3.260 | 0.835 | 1.531 | 55.7 |
| 3(ASP) | −3.439 | 0.040 | | |
| 4(ASP) | −3.871 | 0.772 | 1.531 | 55.7 |
| 5(ASP) | −3.466 | 0.040 | | |
| 6(ASP) | 7.741 | 0.455 | 1.650 | 21.5 |
| 7(ASP) | 2.361 | 0.555 | | |
| 8(ASP) | −3.698 | 0.731 | 1.531 | 55.7 |
| 9(ASP) | −1.646 | 0.040 | | |
| 10(ASP) | 2.998 | 0.501 | 1.650 | 21.5 |
| 11(ASP) | 1.655 | 0.245 | | |
| 12(ASP) | 1.304 | 0.520 | 1.531 | 55.7 |
| 13(ASP) | 1.096 | 0.308 | | |
| 14 | ∞ | 0.110 | 1.517 | 64.2 |
| 15 | ∞ | 0.556 | | |
| 16 | (IMG) | −0.006 | | |

TABLE 6

Example 3

| Si | K | A | B | C | D | E |
|---|---|---|---|---|---|---|
| 2 | −12.8223 | 0 | 1.856E−02 | 0 | −3.149E−02 | 0 |
| 3 | 0.6227 | 0 | 5.209E−02 | 0 | −5.945E−02 | 0 |
| 4 | −20.4672 | 8.417E−04 | 7.340E−02 | −1.959E−03 | −3.991E−02 | 2.401E−03 |
| 5 | −17.0923 | 2.482E−02 | −2.617E−02 | −1.289E−02 | 1.490E−02 | 8.070E−03 |
| 6 | −23.5883 | 2.124E−02 | −1.031E−01 | −4.846E−03 | −8.233E−03 | 0.000E+00 |
| 7 | −3.2923 | 0 | −5.684E−02 | 0 | −1.200E−03 | 0 |
| 8 | −12.2637 | 0 | 7.296E−02 | 0 | −2.183E−02 | 0 |
| 9 | −6.8278 | 0 | −3.316E−02 | 0 | 1.677E−02 | 0 |
| 10 | 1.4083 | −2.480E−02 | −8.407E−03 | 0 | −1.717E−02 | 0 |
| 11 | −13.8727 | −1.023E−01 | 1.240E−01 | −4.681E−02 | −3.714E−03 | −3.039E−03 |
| 12 | −7.4557 | −1.104E−01 | −7.915E−02 | 0 | 3.674E−02 | 0 |
| 13 | −5.5999 | 0 | −7.806E−02 | 0 | 2.337E−02 | 0 |

| Si | F | G | H | I | J |
|---|---|---|---|---|---|
| 2 | 3.854E−03 | 0 | −2.706E−03 | 0 | 0 |
| 3 | 1.902E−02 | 0 | −3.513E−03 | 0 | 0 |
| 4 | 1.882E−02 | −7.963E−04 | −3.477E−03 | −1.325E−04 | 2.496E−04 |
| 5 | 1.344E−02 | 2.144E−03 | −1.426E−02 | −4.728E−04 | 2.475E−03 |
| 6 | 4.692E−02 | 0 | −2.241E−02 | 0 | 3.293E−03 |
| 7 | 1.235E−02 | 0 | −6.577E−03 | 0 | 1.071E−03 |
| 8 | −6.923E−04 | 0 | 1.104E−03 | 0 | −1.036E−04 |
| 9 | −9.886E−04 | 0 | −1.225E−03 | 0 | 5.673E−04 |
| 10 | 2.526E−03 | 0 | −1.325E−03 | 0 | 1.164E−04 |
| 11 | 7.764E−04 | −1.004E−04 | 5.003E−04 | 6.337E−05 | −7.270E−05 |
| 12 | −4.208E−03 | 0 | 7.668E−05 | 0 | 9.060E−06 |
| 13 | −3.607E−03 | 0 | 2.993E−04 | 0 | −1.182E−05 |

Numerical Example 4

[Table 7] and [Table 8] each illustrate specific lens data corresponding to the imaging lens according to the fourth configuration example illustrated in FIG. 4. In particular, [Table 7] illustrates basic lens data thereof, and [Table 8] illustrates data related to the aspherical surfaces.

In this fourth configuration example, the first lens L1 has a biconvex shape in vicinity of the optical axis. The second lens L2 has a positive meniscus lens that has a convex surface facing toward the image side in vicinity of the optical axis. The third lens L3 is a negative lens having a concave shape on the image side in vicinity of the optical axis. The fourth lens L4 is a positive lens having a convex shape on the image side in vicinity of the optical axis. The fifth lens L5 is a negative meniscus lens that has a concave surface facing toward the image side in vicinity of the optical axis. The sixth lens L6 is a negative meniscus lens that has a concave surface facing toward the image side in vicinity of the optical axis. The aperture stop St is provided in vicinity of the surface on the object side of the first lens L1.

Values of the F number, the total diagonal angle of view 2ω, and the total focal length f of the imaging lens are as follows.

$FNo=2.2$ $f=4.44$ $2\omega 65.3°$

TABLE 7

| | Example 4 | | | |
|---|---|---|---|---|
| Si | Ri | di | ni | vi |
| 1 | (STO) | 0.000 | | |
| 2(ASP) | 4.427 | 0.593 | 1.531 | 55.7 |
| 3(ASP) | −2.933 | 0.040 | | |
| 4(ASP) | −5.949 | 0.633 | 1.531 | 55.7 |
| 5(ASP) | −3.655 | 0.040 | | |
| 6(ASP) | −696.743 | 0.505 | 1.614 | 25.8 |
| 7(ASP) | 2.411 | 0.445 | | |
| 8(ASP) | −23.833 | 1.355 | 1.531 | 55.7 |
| 9(ASP) | −2.335 | 0.040 | | |
| 10(ASP) | 4.489 | 0.400 | 1.531 | 55.7 |
| 11(ASP) | 3.856 | 0.786 | | |
| 12(ASP) | 3.332 | 0.400 | 1.531 | 55.7 |
| 13(ASP) | 1.336 | 0.269 | | |
| 14 | ∞ | 0.245 | 1.517 | 64.2 |
| 15 | ∞ | 0.399 | | |
| 16 | (IMG) | 0.001 | | |

TABLE 8

| | Example 4 | | | | | |
|---|---|---|---|---|---|---|
| Si | K | A | B | C | D | E |
| 2 | −24.3639 | 0 | −1.832E−02 | 0 | −4.296E−02 | 0 |
| 3 | −3.3697 | 0 | 3.308E−02 | 0 | −6.550E−02 | 0 |
| 4 | −30.0000 | 0 | 1.129E−01 | 0 | −4.129E−02 | 0 |
| 5 | −30.0000 | 0 | −1.887E−03 | 0 | 2.374E−03 | 0 |
| 6 | 30.0000 | 0 | −5.265E−02 | 0 | −1.472E−02 | 0 |
| 7 | −10.2784 | 0 | −7.965E−03 | 0 | −8.192E−03 | 0 |
| 8 | 28.8935 | 0 | 2.778E−03 | 0 | −7.187E−03 | 0 |
| 9 | −2.3122 | 0 | −1.445E−02 | 0 | −2.058E−03 | 0 |
| 10 | 1.8171 | 0 | −3.054E−02 | 0 | −2.795E−03 | 0 |
| 11 | −19.1554 | 0 | 4.396E−03 | 0 | −1.448E−02 | 0 |
| 12 | −30.0000 | 0 | −1.566E−01 | 0 | 3.502E−02 | 0 |
| 13 | −5.0365 | 0 | −7.791E−02 | 0 | 2.521E−02 | 0 |

TABLE 8-continued

| | Example 4 | | | | | |
|---|---|---|---|---|---|---|
| | F | G | H | I | J | |
| 2 | 7.472E−03 | 0 | −1.839E−03 | 0 | 0 | |
| 3 | 2.229E−02 | 0 | −4.561E−03 | 0 | 0 | |
| 4 | 1.760E−02 | 0 | −4.585E−03 | 0 | 0 | |
| 5 | 4.850E−03 | 0 | −1.400E−02 | 0 | 4.251E−03 | |
| 6 | 3.452E−02 | 0 | −2.600E−02 | 0 | 6.672E−03 | |
| 7 | 1.190E−02 | 0 | −5.258E−03 | 0 | 1.037E−03 | |
| 8 | −5.628E−03 | 0 | 3.277E−03 | 0 | −1.103E−03 | |
| 9 | −1.319E−03 | 0 | 4.171E−04 | 0 | −1.100E−04 | |
| 10 | −3.959E−03 | 0 | 1.546E−03 | 0 | −2.864E−04 | |
| 11 | 1.295E−03 | 0 | 1.570E−04 | 0 | −9.823E−05 | |
| 12 | −3.483E−03 | 0 | −7.266E−04 | 0 | 1.036E−04 | |
| 13 | −5.629E−03 | 0 | 6.388E−04 | 0 | −2.790E−05 | |

Numerical Example 5

[Table 9] and [Table 10] each illustrate specific lens data corresponding to the imaging lens according to the fifth configuration example illustrated in FIG. 5. In particular, [Table 9] illustrates basic lens data thereof, and [Table 10] illustrates data related to the aspherical surfaces.

In this fifth configuration example, the first lens L1 has a biconvex shape in vicinity of the optical axis. The second lens L2 has a positive meniscus lens that has a convex surface facing toward the image side in vicinity of the optical axis. The third lens L3 is a negative lens having a concave shape on the image side in vicinity of the optical axis. The fourth lens L4 is a positive lens having a convex shape on the image side in vicinity of the optical axis. The fifth lens L5 is a negative meniscus lens that has a concave surface facing toward the image side in vicinity of the optical axis. The sixth lens L6 is a negative meniscus lens that has a concave surface facing toward the image side in vicinity of the optical axis. The aperture stop St is provided in vicinity of the surface on the object side of the first lens L1.

Values of the F number, the total diagonal angle of view 2ω, and the total focal length f of the imaging lens are as follows.

$FNo=1.9$ $f=4.4$ $2\omega=65.74°$

TABLE 9

| | Example 5 | | | |
|---|---|---|---|---|
| Si | Ri | di | ni | vi |
| 1 | (STO) | 0.000 | | |
| 2(ASP) | 3.819 | 0.780 | 1.531 | 55.7 |
| 3(ASP) | −2.719 | 0.040 | | |
| 4(ASP) | −4.456 | 0.836 | 1.531 | 55.7 |
| 5(ASP) | −3.657 | 0.040 | | |
| 6(ASP) | 15.481 | 0.399 | 1.641 | 22.5 |
| 7(ASP) | 2.354 | 0.535 | | |
| 8(ASP) | −7.882 | 1.178 | 1.531 | 55.7 |
| 9(ASP) | −2.326 | 0.040 | | |
| 10(ASP) | 2.710 | 0.400 | 1.650 | 21.5 |
| 11(ASP) | 2.430 | 0.650 | | |
| 12(ASP) | 4.799 | 0.400 | 1.531 | 55.7 |
| 13(ASP) | 1.673 | 0.208 | | |

TABLE 9-continued

Example 5

| Si | Ri | di | ni | vi |
|---|---|---|---|---|
| 14 | ∞ | 0.245 | 1.517 | 64.2 |
| 15 | ∞ | 0.395 | | |
| 16 | (IMG) | 0.005 | | |

TABLE 10

Example 5

| Si | K | A | B | C | D | E |
|---|---|---|---|---|---|---|
| 2 | −17.7031 | 0 | 1.434E−03 | 0 | −3.531E−02 | 0 |
| 3 | −2.9519 | 0 | 5.027E−02 | 0 | −6.916E−02 | 0 |
| 4 | −20.2071 | 0 | 1.022E−01 | 0 | −4.318E−02 | 0 |
| 5 | −30.0000 | 0 | 1.297E−02 | 0 | 6.256E−03 | 0 |
| 6 | −30.0000 | 0 | −5.532E−02 | 0 | −1.400E−02 | 0 |
| 7 | −8.7702 | 0 | −1.964E−02 | 0 | −1.097E−02 | 0 |
| 8 | −30.0000 | 0 | 4.470E−02 | 0 | −2.483E−02 | 0 |
| 9 | −8.1926 | 0 | −2.096E−02 | 0 | 3.381E−03 | 0 |
| 10 | −4.2360 | 0 | −2.520E−02 | 0 | −2.846E−04 | 0 |
| 11 | −12.8320 | 0 | −2.314E−03 | 0 | −1.788E−02 | 0 |
| 12 | −17.5081 | −2.136E−02 | −1.527E−01 | 0 | 3.926E−02 | 0 |
| 13 | −5.5605 | 0 | −8.404E−02 | 0 | 2.545E−02 | 0 |

| Si | F | G | H | I | J |
|---|---|---|---|---|---|
| 2 | 4.774E−03 | 0 | −2.049E−03 | 0 | 0 |
| 3 | 2.340E−02 | 0 | −4.319E−03 | 0 | 0 |
| 4 | 1.758E−02 | 0 | −2.897E−03 | 0 | 0 |
| 5 | 8.234E−03 | 0 | −1.455E−02 | 0 | 3.444E−03 |
| 6 | 3.661E−02 | 0 | −2.505E−02 | 0 | 5.113E−03 |
| 7 | 1.211E−02 | 0 | −5.262E−03 | 0 | 9.078E−04 |
| 8 | 2.986E−04 | 0 | 2.031E−03 | 0 | −4.829E−04 |
| 9 | −1.722E−03 | 0 | 2.937E−04 | 0 | 9.404E−05 |
| 10 | −6.409E−03 | 0 | 2.339E−03 | 0 | −3.647E−04 |
| 11 | 1.873E−03 | 0 | 4.028E−04 | 0 | −1.051E−04 |
| 12 | −2.836E−03 | 0 | −1.810E−04 | 0 | 2.036E−05 |
| 13 | −3.996E−03 | 0 | 3.339E−04 | 0 | −1.286E−05 |

Numerical Example 6

[Table 11] and [Table 12] each illustrate specific lens data corresponding to the imaging lens according to the sixth configuration example illustrated in FIG. 6. In particular, [Table 11] illustrates basic lens data thereof, and [Table 12] illustrates data related to the aspherical surfaces.

In this sixth configuration example, the first lens L1 has a biconvex shape in vicinity of the optical axis. The second lens L2 has a positive meniscus lens that has a convex surface facing toward the image side in vicinity of the optical axis. The third lens L3 is a negative lens having a concave shape on the image side in vicinity of the optical axis. The fourth lens L4 is a positive lens having a convex shape on the image side in vicinity of the optical axis. The fifth lens L5 is a negative meniscus lens that has a concave surface facing toward the image side in vicinity of the optical axis. The sixth lens L6 is a negative meniscus lens that has a concave surface facing toward the image side in vicinity of the optical axis. The aperture stop St is provided in vicinity of the surface on the object side of the first lens L1.

Values of the F number, the total diagonal angle of view 2ω, and the total focal length f of the imaging lens are as follows.

$FNo=1.8$ $f=4.39$ $2\omega=65.92°$

TABLE 11

Example 6

| Si | Ri | di | ni | vi |
|---|---|---|---|---|
| 1 | (STO) | 0.000 | | |
| 2(ASP) | 3.496 | 0.749 | 1.531 | 55.7 |
| 3(ASP) | −3.207 | 0.040 | | |
| 4(ASP) | −4.154 | 0.899 | 1.531 | 55.7 |
| 5(ASP) | −3.651 | 0.040 | | |
| 6(ASP) | 9.207 | 0.434 | 1.650 | 21.5 |
| 7(ASP) | 2.353 | 0.566 | | |
| 8(ASP) | −12.153 | 1.140 | 1.531 | 55.7 |
| 9(ASP) | −2.155 | 0.040 | | |
| 10(ASP) | 3.760 | 0.423 | 1.650 | 21.5 |
| 11(ASP) | 3.039 | 0.557 | | |
| 12(ASP) | 7.986 | 0.400 | 1.531 | 55.7 |
| 13(ASP) | 1.801 | 0.217 | | |
| 14 | ∞ | 0.245 | 1.517 | 64.2 |
| 15 | ∞ | 0.390 | | |
| 16 | (IMG) | 0.010 | | |

TABLE 12

Example 6

| Si | K | A | B | C | D | E |
|---|---|---|---|---|---|---|
| 2 | −11.7919 | 0 | 1.614E−03 | 0 | −2.670E−02 | 0 |
| 3 | −1.3907 | 0 | 5.940E−02 | 0 | −6.613E−02 | 0 |
| 4 | −29.9817 | −3.335E−03 | 8.686E−02 | 2.006E−03 | −3.975E−02 | 1.918E−03 |
| 5 | −28.8146 | 7.746E−03 | −9.237E−03 | −7.021E−03 | 1.286E−02 | 4.473E−03 |
| 6 | −30.0000 | 9.632E−03 | −8.514E−02 | 2.032E−03 | −9.538E−03 | 0 |
| 7 | −7.7391 | 0 | −3.358E−02 | 0 | −7.079E−03 | 0 |
| 8 | −30.0000 | 0 | 5.262E−02 | 0 | −2.302E−02 | 0 |
| 9 | −10.3228 | 0 | −1.357E−02 | 0 | 4.760E−03 | 0 |
| 10 | 2.0862 | −7.093E−03 | −1.514E−02 | 0 | −1.747E−02 | 0 |
| 11 | −30.0000 | −5.454E−03 | 3.165E−02 | −3.109E−02 | −4.528E−03 | −6.867E−04 |
| 12 | −4.4110 | −2.481E−02 | −1.339E−01 | 0 | 3.058E−02 | 0 |
| 13 | −6.1713 | 0 | −6.542E−02 | 0 | 1.713E−02 | 0 |

| Si | F | G | H | I | J |
|---|---|---|---|---|---|
| 2 | −9.320E−04 | 0 | −2.944E−04 | 0 | 0 |
| 3 | 2.060E−02 | 0 | −3.469E−03 | 0 | 0 |
| 4 | 1.818E−02 | −9.587E−04 | −3.501E−03 | −7.885E−05 | 2.541E−04 |

TABLE 12-continued

| | | Example 6 | | | |
|---|---|---|---|---|---|
| 5 | 1.082E−02 | 8.581E−04 | −1.457E−02 | −1.759E−04 | 2.907E−03 |
| 6 | 4.108E−02 | 0 | −2.421E−02 | 0 | 4.266E−03 |
| 7 | 1.252E−02 | 0 | −5.580E−03 | 0 | 9.587E−04 |
| 8 | 6.417E−04 | 0 | 8.381E−04 | 0 | −7.593E−05 |
| 9 | −2.552E−03 | 0 | 1.008E−05 | 0 | 1.782E−04 |
| 10 | 2.229E−03 | 0 | −6.764E−04 | 0 | 3.519E−05 |
| 11 | 5.999E−04 | −2.439E−04 | 3.754E−04 | 2.736E−05 | −5.466E−05 |
| 12 | −2.885E−03 | 0 | 2.105E−04 | 0 | −2.026E−05 |
| 13 | −2.203E−03 | 0 | 1.353E−04 | 0 | −4.173E−06 |

Numerical Example 7

[Table 13] and [Table 14] each illustrate specific lens data corresponding to the imaging lens according to the seventh configuration example illustrated in FIG. 7. In particular, [Table 13] illustrates basic lens data thereof, and [Table 14] illustrates data related to the aspherical surfaces.

In this seventh configuration example, the first lens L1 has a positive meniscus lens that has a convex surface facing toward the image side in vicinity of the optical axis. The second lens L2 has a biconvex shape. The third lens L3 is a negative lens having a concave shape on the image side in vicinity of the optical axis. The fourth lens L4 is a positive lens having a convex shape on the image side in vicinity of the optical axis. The fifth lens L5 is a negative meniscus lens that has a concave surface facing toward the image side in vicinity of the optical axis. The sixth lens L6 is a negative meniscus lens that has a concave surface facing toward the image side in vicinity of the optical axis. The aperture stop St is provided between the first lens L1 and the second lens L2.

Values of the F number, the total diagonal angle of view 2ω, and the total focal length f of the imaging lens are as follows.

$FNo=1.6$ $f=4.46$ $2\omega=65.04°$

TABLE 13

| | | Example 7 | | |
|---|---|---|---|---|
| Si | Ri | di | ni | vi |
| 1(ASP) | 3.128 | 0.605 | 1.531 | 55.7 |
| 2(ASP) | 27.603 | 0.040 | | |
| 3 | (STO) | 0.030 | | |
| 4(ASP) | 8.326 | 1.171 | 1.531 | 55.7 |
| 5(ASP) | −3.713 | 0.040 | | |
| 6(ASP) | 8.777 | 0.455 | 1.647 | 21.8 |
| 7(ASP) | 2.181 | 0.676 | | |
| 8(ASP) | −5.330 | 0.807 | 1.531 | 55.7 |
| 9(ASP) | −2.423 | 0.040 | | |
| 10(ASP) | 5.437 | 0.611 | 1.650 | 21.5 |
| 11(ASP) | 3.564 | 0.212 | | |
| 12(ASP) | 2.024 | 0.520 | 1.531 | 55.7 |
| 13(ASP) | 1.368 | 0.236 | | |
| 14 | ∞ | 0.110 | 1.517 | 64.2 |
| 15 | ∞ | 0.540 | | |
| 16 | (IMG) | 0.010 | | |

TABLE 14

| | | | Example 7 | | | |
|---|---|---|---|---|---|---|
| Si | K | A | B | C | D | E |
| 1 | −11.8963 | 0 | 2.942E−02 | 0 | −2.387E−02 | 0 |
| 2 | −23.3354 | 0 | 5.615E−02 | 0 | −5.144E−02 | 0 |
| 4 | −1.4195 | −1.007E−03 | 9.316E−02 | −5.042E−03 | −4.536E−02 | 3.690E−04 |
| 5 | −14.1986 | 5.384E−02 | −3.908E−02 | −2.357E−02 | 8.354E−03 | 5.319E−03 |
| 6 | 17.2078 | 4.848E−02 | −8.802E−02 | −8.227E−03 | −1.752E−02 | 0 |
| 7 | −1.0889 | 0 | −4.514E−02 | 0 | −1.479E−03 | 0 |
| 8 | 11.4904 | 0 | 3.876E−02 | 0 | −8.101E−03 | 0 |
| 9 | −3.7434 | 0 | −2.629E−02 | 0 | 4.912E−03 | 0 |
| 10 | −0.9553 | −1.744E−02 | −9.212E−03 | 0 | −1.311E−02 | 0 |
| 11 | −27.9148 | −1.069E−01 | 9.005E−02 | −4.276E−02 | −2.211E−03 | −1.486E−03 |
| 12 | −8.6705 | −1.631E−01 | −7.120E−02 | 0 | 3.882E−02 | 0 |
| 13 | −7.4466 | 0 | −7.449E−02 | 0 | 2.359E−02 | 0 |

| | F | G | H | I | J |
|---|---|---|---|---|---|
| 1 | 3.870E−03 | 0 | −6.084E−04 | 0 | 0 |
| 2 | 1.384E−02 | 0 | −1.775E−03 | 0 | 0 |
| 4 | 1.850E−02 | −5.877E−04 | −3.174E−03 | 2.725E−04 | −1.954E−05 |
| 5 | 1.359E−02 | 3.408E−03 | −1.279E−02 | 9.121E−05 | 1.944E−03 |
| 6 | 4.123E−02 | 0 | −2.182E−02 | 0 | 3.983E−03 |
| 7 | 1.362E−02 | 0 | −6.442E−03 | 0 | 1.022E−03 |
| 8 | −1.332E−04 | 0 | 7.191E−04 | 0 | −1.373E−06 |
| 9 | −1.251E−03 | 0 | −5.396E−04 | 0 | 3.536E−04 |
| 10 | 5.307E−03 | 0 | −2.544E−03 | 0 | 3.904E−04 |
| 11 | 1.670E−03 | 2.433E−06 | 2.127E−04 | −9.041E−05 | −8.262E−06 |

TABLE 14-continued

| | | Example 7 | | | |
|---|---|---|---|---|---|
| 12 | −4.484E−03 | 0 | 5.831E−05 | 0 | 1.400E−05 |
| 13 | −3.571E−03 | 0 | 2.454E−04 | 0 | −6.868E−06 |

Numerical Example 8

[Table 15] and [Table 16] each illustrate specific lens data corresponding to the imaging lens according to the eighth configuration example illustrated in FIG. 8. In particular, [Table 15] illustrates basic lens data thereof, and [Table 16] illustrates data related to the aspherical surfaces.

In this eighth configuration example, the first lens L1 has a biconvex shape in vicinity of the optical axis. The second lens L2 has a positive meniscus lens that has a convex surface facing toward the image side in vicinity of the optical axis. The third lens L3 is a negative lens having a concave shape on the image side in vicinity of the optical axis. The fourth lens L4 is a positive lens having a convex shape on the image side in vicinity of the optical axis. The fifth lens L5 is a negative meniscus lens that has a concave surface facing toward the image side in vicinity of the optical axis. The sixth lens L6 is a negative meniscus lens that has a concave surface facing toward the image side in vicinity of the optical axis. The aperture stop St is provided in vicinity of the surface on the object side of the first lens L1.

Values of the F number, the total diagonal angle of view 2ω, and the total focal length f of the imaging lens are as follows.

$FNo=2.2$ $f=4.43$ $2\omega=65.46°$

TABLE 15

| | Example 8 | | | |
|---|---|---|---|---|
| Si | Ri | di | ni | vi |
| 1 | (STO) | 0.000 | | |
| 2(ASP) | 4.503 | 0.585 | 1.531 | 55.7 |
| 3(ASP) | −2.905 | 0.040 | | |
| 4(ASP) | −6.103 | 0.631 | 1.531 | 55.7 |
| 5(ASP) | −3.624 | 0.040 | | |
| 6(ASP) | 103.997 | 0.508 | 1.610 | 26.6 |
| 7(ASP) | 2.179 | 0.410 | | |
| 8(ASP) | 104.101 | 1.439 | 1.531 | 55.7 |
| 9(ASP) | −2.429 | 0.040 | | |
| 10(ASP) | 5.170 | 0.400 | 1.531 | 55.7 |
| 11(ASP) | 4.319 | 0.741 | | |

TABLE 15-continued

| | Example 8 | | | |
|---|---|---|---|---|
| Si | Ri | di | ni | vi |
| 12(ASP) | 3.181 | 0.400 | 1.531 | 55.7 |
| 13(ASP) | 1.302 | 0.272 | | |
| 14 | ∞ | 0.245 | 1.517 | 64.2 |
| 15 | ∞ | 0.400 | | |
| 16 | (IMG) | 0.002 | | |

TABLE 16

| | Example 8 | | | | |
|---|---|---|---|---|---|
| Si | K | A | B | C | D | E |
| 2 | −25.1827 | 0 | −1.952E−02 | 0 | −4.231E−02 | 0 |
| 3 | −3.6447 | 0 | 3.423E−02 | 0 | −6.393E−02 | 0 |
| 4 | −30.0000 | 0 | 1.163E−01 | 0 | −4.083E−02 | 0 |
| 5 | −30.0000 | 0 | −7.996E−04 | 0 | −2.923E−04 | 0 |
| 6 | −30.0000 | 0 | −5.700E−02 | 0 | −1.400E−02 | 0 |
| 7 | −8.7380 | 0 | −7.730E−03 | 0 | −8.309E−03 | 0 |
| 8 | 30.0000 | 0 | 3.710E−03 | 0 | −5.761E−03 | 0 |
| 9 | −2.6520 | 0 | −1.458E−02 | 0 | −2.606E−03 | 0 |
| 10 | 2.0884 | 0 | −2.312E−02 | 0 | −5.058E−03 | 0 |
| 11 | −30.0000 | 0 | 1.551E−02 | 0 | −1.959E−02 | 0 |
| 12 | −30.0000 | 0 | −1.579E−01 | 0 | 3.709E−02 | 0 |
| 13 | −5.0882 | 0 | −7.785E−02 | 0 | 2.537E−02 | 0 |

| Si | F | G | H | I | J |
|---|---|---|---|---|---|
| 2 | 8.667E−03 | 0 | −1.956E−03 | 0 | 0 |
| 3 | 2.131E−02 | 0 | −4.173E−03 | 0 | 0 |
| 4 | 1.586E−02 | 0 | −3.921E−03 | 0 | 0 |
| 5 | 6.332E−03 | 0 | −1.331E−02 | 0 | 3.891E−03 |
| 6 | 3.483E−02 | 0 | −2.541E−02 | 0 | 6.315E−03 |
| 7 | 1.213E−02 | 0 | −5.376E−03 | 0 | 1.017E−03 |
| 8 | −6.672E−03 | 0 | 3.919E−03 | 0 | −1.212E−03 |
| 9 | −1.144E−03 | 0 | 4.292E−04 | 0 | −1.148E−04 |
| 10 | −5.074E−03 | 0 | 2.139E−03 | 0 | −3.773E−04 |
| 11 | 1.965E−03 | 0 | 2.338E−04 | 0 | −1.189E−04 |
| 12 | −4.438E−03 | 0 | −5.498E−04 | 0 | 9.167E−05 |
| 13 | −5.790E−03 | 0 | 6.667E−04 | 0 | −2.920E−05 |

[Other Numerical Data of Respective Examples]

[Table 17] illustrates a summary of values related to the above-described respective conditional expressions for the respective numerical examples. As can be seen from [Table 17], in the respective conditional expressions, the values in the respective numerical examples are within the ranges of the numerical values.

TABLE 17

| Conditional Expression | | Example 1 | Example 2 | Example 3 | Example 4 | Example 5 | Example 6 | Example 7 | Example 8 |
|---|---|---|---|---|---|---|---|---|---|
| (1) | vd3 | 21.5 | 22.2 | 21.5 | 25.8 | 22.5 | 21.5 | 21.8 | 26.6 |
| (2) | vd5 | 21.5 | 21.5 | 21.5 | 55.7 | 21.5 | 21.5 | 21.5 | 55.7 |
| (3) | vd1 | 55.7 | 55.7 | 55.7 | 55.7 | 55.7 | 55.7 | 55.7 | 55.7 |
| (4) | vd2 | 55.7 | 55.7 | 55.7 | 55.7 | 55.7 | 55.7 | 55.7 | 55.7 |
| (5) | vd4 | 55.7 | 55.7 | 55.7 | 55.7 | 55.7 | 55.7 | 55.7 | 55.7 |
| (6) | vd6 | 55.7 | 55.7 | 55.7 | 55.7 | 55.7 | 55.7 | 55.7 | 55.7 |
| (7) | f/f2 | 0.08 | 0.09 | 0.10 | 0.27 | 0.16 | 0.13 | 0.89 | 0.29 |
| (8) | f/f3 | −0.80 | −0.76 | −0.73 | −1.15 | −1.01 | −0.89 | −0.98 | −1.22 |
| (9) | f/f5 | −0.51 | −0.58 | −0.59 | −0.07 | −0.05 | −0.14 | −0.25 | −0.08 |

TABLE 17-continued

| Conditional Expression | | Example 1 | Example 2 | Example 3 | Example 4 | Example 5 | Example 6 | Example 7 | Example 8 |
|---|---|---|---|---|---|---|---|---|---|
| (10) | f/f6 | −0.30 | 0.04 | −0.04 | −0.99 | −0.88 | −0.99 | −0.41 | −0.99 |
| (11) | f2/f3 | −9.82 | −8.70 | −6.99 | −4.19 | −6.47 | −7.08 | −1.09 | −4.24 |
| (12) | f2/f1 | 15.24 | 13.33 | 11.39 | 4.77 | 9.03 | 10.68 | 0.76 | 4.51 |
| (13) | f5/f6 | 0.60 | −0.07 | 0.07 | 14.62 | 16.35 | 7.04 | 1.65 | 13.17 |

[Aberration Performance]

FIGS. 9 to 16 illustrate aberration performance of the respective numerical examples. In each of the drawings, spherical aberration, astigmatism, and distortion are illustrated in aberration diagrams. Each aberration diagram illustrates aberration where d-line is used as a reference wavelength. Each spherical aberration diagram also illustrates aberration of g-line (having a wavelength of 435.8 nm) and aberration of C-line (having a wavelength of 656.3 nm). In the astigmatism diagram, ΔS represents aberration in a sagittal direction, and ΔM represents aberration in a meridional (tangential) direction.

As can be seen from the above-described respective aberration diagrams, an imaging lens in which aberration is favorably corrected is achieved in each example.

5. Other Embodiments

The technology of the present disclosure is not limited to the description above of the example embodiments and examples, and may be variously modified.

For example, the shapes of the respective sections and the numerical values in the respective numerical examples described above are mere specific examples to embody the present technology and the technical range of the present technology should not be limitedly construed based thereon.

Further, the above embodiment and examples have been described on a configuration substantially including six lenses; however, a configuration may be employed in which a lens that has substantially no refractive power is further provided.

It is possible to achieve at least the following configurations from the above-described example embodiments and the modifications of the disclosure.

[1] An imaging lens including:
a first lens having positive refractive power;
a second lens having positive refractive power;
a third lens having negative refractive power;
a fourth lens having positive refractive power;
a fifth lens having negative refractive power; and
a sixth lens having positive or negative refractive power in vicinity of an optical axis, a peripheral portion of a surface on an image side of the sixth lens including one or more inflection points,
the first to sixth lenses being provided in order from an object side.

[2] The imaging lens according to [1], in which the following conditional expressions are satisfied, $$vd3<30 \tag{1}$$

$$vd5>20 \tag{2}$$

where vd3 is an Abbe number of the third lens at d-line, and vd5 is an Abbe number of the fifth lens at d-line.

[3] The imaging lens according to [1] or [2], in which the following conditional expressions are satisfied, $$vd1>50 \tag{3}$$

$$vd2>50 \tag{4}$$

$$vd4>50 \tag{5}$$

$$vd6>50 \tag{6}$$

where vd1 is an Abbe number of the first lens at d-line, vd2 is an Abbe number of the second lens at d-line, vd4 is an Abbe number of the fourth lens at d-line, and vd6 is an Abbe number of the sixth lens at d-line.

[4] The imaging lens according to any one of [1] to [3], in which the following conditional expression is satisfied, $$0<f/f2<1.1 \tag{7}$$

f is a total focal length of the imaging lens, and f2 is a focal length of the second lens.

[5] The imaging lens according to any one of [1] to [4], in which the following conditional expression is satisfied, $$-1.35<f/f3<-0.66 \tag{8}$$

where f3 is a focal length of the third lens.

[6] The imaging lens according to any one of [1] to [5], in which the following conditional expression is satisfied, $$-0.7<f/f5<0 \tag{9}$$

where f5 is a focal length of the fifth lens.

[7] The imaging lens according to any one of [1] to [6], in which the following expression is satisfied, $$-1.2<f/f6<0.2 \tag{10}$$

where f6 is a focal length of the sixth lens.

[8] The imaging lens according to any one of [1] to [7], in which the following conditional expression is satisfied, $$-12<f2/f3<-0.1 \tag{11}$$

The imaging lens according to any one of [1] to [8], in which the following conditional expression is satisfied, $$0<f2/f1<18 \tag{12}$$

f1 is a focal length of the first lens.

[10] The imaging lens according to any one of [1] to [9], in which the following conditional expression is satisfied, $$-1<f5/f6<19 \tag{13}$$

[11] The imaging lens according to any one of [1] to [10], in which an aperture stop is disposed on the object side of a surface on the image side of the second lens.

[12] The imaging lens according to any one of [1] to [11], in which all of the first to sixth lenses are made of a resin.

[13] The imaging lens according to any one of [1] to [12], further including a lens having substantially no refractive power.

[14] An imaging unit including:
an imaging lens; and
an imaging device configured to output an imaging signal based on an optical image formed by the imaging lens, the imaging lens including
a first lens having positive refractive power,
a second lens having positive refractive power,
a third lens having negative refractive power,
a fourth lens having positive refractive power,
a fifth lens having negative refractive power, and
a sixth lens having positive or negative refractive power in vicinity of an optical axis, a peripheral portion of a surface on an image side of the sixth lens including one or more inflection points,
the first to sixth lenses being provided in order from an object side.

[15] The imaging unit according to [14], in which the imaging lens further includes a lens having substantially no refractive power.

The present application contains subject matter related to that disclosed in Japanese Priority Patent Application JP 2013-75653 filed in the Japan Patent Office on Apr. 1, 2013, the entire contents of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging lens, comprising:
a first lens having a first positive refractive power;
a second lens having a second positive refractive power;
a third lens having a first negative refractive power;
a fourth lens having a third positive refractive power;
a fifth lens having a second negative refractive power; and
a sixth lens having a fourth positive refractive power or a third negative refractive power in vicinity of an optical axis of the imaging lens, a surface on an image side of the sixth lens including one or more inflection points,
wherein the first to the sixth lenses are provided in an order from an object side,
wherein the first to the sixth lenses allow light rays to enter at an angle ranging from 65.04.degree to 72.18.degree, and
wherein an Abbe number of the second lens at d-line is greater than 50.

2. The imaging lens according to claim 1, wherein the following conditional expressions are satisfied, $$vd3<30 \tag{1}$$

$$vd5>20 \tag{2}$$

where vd3 is an Abbe number of the third lens at the d-line, and vd5 is an Abbe number of the fifth lens at the d-line.

3. The imaging lens according to claim 1, wherein the following conditional expressions are satisfied, $$vd1>50 \tag{3}$$

$$vd4>50 \tag{5}$$

$$vd6>50 \tag{6}$$

where vd1 is an Abbe number of the first lens at the d-line, vd4 is an Abbe number of the fourth lens at the d-line, and vd6 is an Abbe number of the sixth lens at the d-line.

4. The imaging lens according to claim 1, wherein the following conditional expression is satisfied, $$0<f/f2<1.1 \tag{7}$$

where f is a total focal length of the imaging lens, and f2 is a focal length of the second lens.

5. The imaging lens according to claim 1, wherein the following conditional expression is satisfied, $$-1.35<f/f3<-0.66 \tag{8}$$

where f is a total focal length of the imaging lens, and f3 is a focal length of the third lens.

6. The imaging lens according to claim 1, wherein the following conditional expression is satisfied, $$-0.7<f/f5<0 \tag{9}$$

where f is a total focal length of the imaging lens, and f5 is a focal length of the fifth lens.

7. The imaging lens according to claim 1, wherein the following expression is satisfied, $$-1.2<f/f6<0.2 \tag{10}$$

where f is a total focal length of the imaging lens, and f6 is a focal length of the sixth lens.

8. The imaging lens according to claim 1, wherein the following conditional expression is satisfied, $$-12<f2/f3<-0.1 \tag{11}$$

where f2 is a focal length of the second lens, and f3 is a focal length of the third lens.

9. The imaging lens according to claim 1, wherein the following conditional expression is satisfied, $$0<f2/f1<18 \tag{12}$$

where f1 is a focal length of the first lens, and f2 is a focal length of the second lens.

10. The imaging lens according to claim 1, wherein the following conditional expression is satisfied, $$-1<f5/f6<19 \tag{13}$$

where f5 is a focal length of the fifth lens and f6 is a focal length of the sixth lens.

11. The imaging lens according to claim 1, wherein an aperture stop is provided between the first lens and the second lens.

12. The imaging lens according to claim 1, wherein each of the first to the sixth lenses are made of a resin.

13. An imaging unit, comprising:
an imaging lens; and
circuitry configured to output an imaging signal based on an optical image the from the imaging lens,
wherein the imaging lens includes:
a first lens having a first positive refractive power,
a second lens having a second positive refractive power,
a third lens having a first negative refractive power,
a fourth lens having a third positive refractive power,
a fifth lens having a second negative refractive power, and
a sixth lens having a fourth positive refractive power or a third negative refractive power in vicinity of an optical axis of the imaging lens, a surface on an image side of the sixth lens including one or more inflection points,
wherein the first to the sixth lenses are provided in an order from an object side,
wherein the first to the sixth lenses allow light rays to enter at an angle ranging from 65.04.degree to 72.18.degree, and
wherein an Abbe number of the second lens at d-line is greater than 50.

* * * * *